United States Patent
Aoki et al.

(10) Patent No.: US 6,578,061 B1
(45) Date of Patent: Jun. 10, 2003

(54) METHOD AND APPARATUS FOR DATA PERMUTATION/DIVISION AND RECORDING MEDIUM WITH DATA PERMUTATION/DIVISION PROGRAM RECORDED THEREON

(75) Inventors: Kazumaro Aoki, Yokohama (JP); Hiroki Ueda, Kawasaki (JP); Masayuki Kanda, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/487,597

(22) Filed: Jan. 19, 2000

(30) Foreign Application Priority Data

| Jan. 19, 1999 | (JP) | 11-010788 |
| Jan. 25, 1999 | (JP) | 11-015525 |
| Jan. 25, 1999 | (JP) | 11-016238 |
| Mar. 17, 1999 | (JP) | 11-071255 |

(51) Int. Cl.$^7$ .............................. G06F 7/32; H04L 9/28
(52) U.S. Cl. ........................... 708/520; 380/28
(58) Field of Search ................... 708/520, 491–492; 380/28

(56) References Cited

U.S. PATENT DOCUMENTS

| 5,539,827 A | * 7/1996 | Liu | 380/28 |
| 5,687,238 A | * 11/1997 | Shimada | 380/28 |
| 5,825,886 A | * 10/1998 | Adams et al. | 380/28 |
| 6,298,136 B1 | * 10/2001 | Den Boer | 380/28 |
| 6,408,075 B1 | * 6/2002 | Ohki et al. | 380/28 |

FOREIGN PATENT DOCUMENTS

| JP | 60-167062 | 8/1985 |
| JP | 11-071255 | 3/1999 |

OTHER PUBLICATIONS

The Cipher SHARK, Lecture Notes in Computer Science, Vincent Rijmen et al., vol. 1039, p. 99–111, Undated.
Kanda, Masayuki, et al., "A New 128–bit Block Cipher E2", *Technical Report of IEICE,* The Institute of Electronics, Information and Communication Engineers, Jul. 1998.
Aoki, Kazumaro, et al., "Optimized Softwave Implementation of E2," Presented at the AES, pp. 1–11, Undated.
Aoki, Kazumaro, et al., "Software Implementations for E2," *Proceedings of the 1999 Symposium on Crytography and Information Security,* vol. 2, Jan. 26–29, 1999, pp. 801–806.
Schneiter, Bruce, *Applied Crytography,* $2^{nd}$ Edition, John Wiley & Sons, Chapters 12.4–12.5, 14.10, and 15.5–15–6, pp. 285–293, 347, and 366–367, Undated.
Hans Zassenhaus, "On Hensel Factorization, I," *Journal of Number Theory,* vol. 1, pp. 291–311, 1969.
Rijimen, Vincent, et al., "The Cipher SHARK," *Fast Software Encryption,* Dieter Gollmann, Ed., Springer, pp. 99–110, Undated.

* cited by examiner

*Primary Examiner*—Tan V. Mai
(74) *Attorney, Agent, or Firm*—Connolly Bove Lodge & Hutz LLP

(57) ABSTRACT

In a method for permuting and dividing 16 pieces of k-bit data held in 4k-bit long registers $T_0$, $T_1$, $T_2$ and $T_3$, k being an integer, the data of each register $T_i$ is ANDed with a desired one of mask data (00ffff00), (ff0000ff), (0000ffff) and (ffff0000), and such ANDs are ORed to obtain desired permuted data.

10 Claims, 12 Drawing Sheets

FIG. 5

| i | CONTENTS OF REGISTER y | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| INITIAL STATE | ? | ? | ? | ? | ? | ? | ? | ? | ? | ? | ? | ? | ? | ? | ? | ? | ? | ? | ? | ? | ? | ? | ? | ? | ? | ? | ? | ? | ? | ? | ? | ? |
| 0 | ? | ? | ? | ? | ? | ? | ? | ? | ? | ? | ? | ? | ? | ? | ? | ? | ? | ? | ? | ? | ? | ? | ? | ? | ? | ? | ? | ? | ? | ? | ? | 1 |
| 1 | ? | ? | ? | ? | ? | ? | ? | ? | ? | ? | ? | ? | ? | ? | ? | ? | ? | ? | ? | ? | ? | ? | ? | ? | ? | ? | ? | ? | ? | ? | 1 | - |
| 2 | ? | ? | ? | ? | ? | ? | ? | ? | ? | ? | ? | ? | ? | ? | ? | ? | ? | ? | ? | ? | ? | ? | ? | ? | ? | ? | ? | ? | ? | 1 | - | - |
| 3 | ? | ? | ? | ? | ? | ? | ? | ? | ? | ? | ? | ? | ? | ? | ? | ? | ? | ? | ? | ? | ? | ? | ? | ? | ? | ? | ? | ? | 1 | - | - | - |
| 4 | ? | ? | ? | ? | ? | ? | ? | ? | ? | ? | ? | ? | ? | ? | ? | ? | ? | ? | ? | ? | ? | ? | ? | ? | ? | ? | ? | 1 | - | - | - | - |
| BIT POSITION | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |

METHOD AND APPARATUS FOR DATA PERMUTATION/DIVISION AND RECORDING MEDIUM WITH DATA PERMUTATION/DIVISION PROGRAM RECORDED THEREON

BACKGROUND OF THE INVENTION

The present invention relates to a method and apparatus for efficient implementation of data permutation and division processing in the field of cryptography and a recording medium with a data permutation/division program recorded thereon.

Data encryption is intended to conceal data. Data encryption techniques fall into a common key cryptosystem and a public key cryptosystem.

The public key cryptosystem uses different keys for data encryption and for decryption; usually, the encryption key is made public and the decryption key is held by a user in secrecy. It is believed that the description key could not be derived from the encryption key within a practical amount of time even with modern mathematical theories and the computing power of the present-day computer.

On the other hand, the common key cryptosystem uses the same key for data encryption and decryption. To implement a fast and secure common key cipher, there is proposed a block encipherment scheme that divides data to be enciphered into blocks of an appropriate length and enciphers them one by one. Many of the block ciphers have a structure called a Feistel network. With this structure, an input of 2n bits is divided to right and left pieces of n-bit data, a function f is operated on the right n-bit data, then its output is exclusive ORed with the left n-bit data, then the right and left pieces of data are swapped, and the same operation is repeated. This structure is shown in, "Bruce Schneier, Applied Cryptography, $2^{nd}$ edition, John-Wiley and Sons, p347, 1996."

The common key cryptosystem is smaller in computational complexity than the public key cryptosystem, and the amount of data that can be encrypted per unit time in the former cryptosystem is tens to hundreds of times larger than in the latter cryptosystem. For this reason, there are tendencies to use the common key cryptosystem when fast encryption processing is necessary.

The common key cryptosystem is required to have security against cryptanalysis as well as the above-mentioned high-speed performance. In recent years there have been proposed several methods of cryptanalysis for common key encryption algorithms. It is necessary, therefore, that a common key encryption algorithm to be newly developed be always secure against such cryptanalysis methods. These cryptanalysis methods are described, for example, in "Bruce Schneier, Applied Cryptography, 2nd edition, John-Wiley and Sons, pp.285–293, 1996."

There have also been studied schemes that would not allow easy application of the cryptanalysis methods, and it can be expected that such preventive schemes will increase the security of the common key encryption algorithm. According to one of such preventive schemes, a value of some kind available from an encryption key is exclusive ORed with input and output data so as to protect the input and output data for the basic encryption, algorithm from an attacker. This scheme is described in "Bruce Schneier, Applied Cryptography, 2nd edition, John-Wiley and Sons, pp.366–367, 1996." Many of common key encryption algorithms proposed in recent years are designed using this scheme.

With the above scheme, the input data exclusive ORed with the value of some kind available from the encryption key is used as input data of the basic encryption algorithm. In the case of using the afore-mentioned Feistel network, the input data needs to be divided to right and left data. Some of recently developed common key encryption algorithms are intended to provide increased security not only by dividing the input data to right and left but also by dividing the input data to right and left even after permutation. An example of such algorithms is an E2 cipher (Masayuki KANDA, et al., "A New 128-bit Block Cipher E2," Technical Report of IEICE, ISEC98-12 (hereinafter referred to simply as literature E2). In the E2 algorithm, a permutation processing called a BP function is defined and then the input data is divided to right and left for input into the Feistel network.

FIG. 1 depicts a basic configuration of an E2 cryptographic device, in which no key scheduling part is shown for brevity. The E2 cryptographic device is made up of an initial transformation part 10, twelve round processing stages $RND_1$ to $RND_{12}$, and a final transformation part 30. The size of each key is, for instance, 128-bit. The initial transformation part 10 comprises: an XOR operation part 11 that exclusive ORs an input plaintext M of, for example, 128 bits with a subkey $k_{13}$; a multiplication part 12 that calculates the product of the output from the XOR operation part 11 and a subkey $k_{14}$; and a byte permutation part (hereinafter referred to as a BP function part) 13 that performs byte permutation of the multiplied output from the multiplication part 12. To increase the operation efficiency, setting the computation size of a CPU of the computer used, for example, at 32 bits, the operation is carried out for each of four 32-bit subblocks divided from the 128-bit data.

The initial transformation part (hereinafter referred to as an IT function part) 10 performs the following operation for an input X=M using the subkeys $k_{13}$ and $k_{14}$.

$$A = IT(X, k_{13}, k_{14}) \tag{1}$$

More specifically, letting $X = (x_1, x_2, x_3, x_4)$ $Y = (y_1, y_2, y_3, y_4)$ $Z = (z_1, z_2, z_4, z_4)$ the following operation is performed by the XOR operation part 11 and the multiplication part 12.

$$Z = (X \oplus k_{13}) \otimes k_{14} = Y \otimes k_{14} \tag{2}$$

In the above, if $k_{14} = (K_1, K_2, K_3, K_4)$, the multiplication $Y \otimes k_{14}$ by the multiplication part 12 is performed as follows:

$$z_i = y_i (K_i \vee 1_{(hex)}) \bmod 2^{32} \text{ for } i=1,2,3,4 \tag{3}$$

The operation symbol a∨b represents the OR of a and b for every corresponding bit. Setting $$(z_i^{(1)}, z_i^{(2)}, z_i^{(3)}, z_i^{(4)}) = z_i \text{ for } i=1,2,3,4 \tag{4}$$

$Z' = (z_1', z_2', z_3', z_4')$

The operation processing of the BP function part 13 is expressed by the following equation:

$$z_i' = (z_i'^{(1)}, z_{i+1}'^{(2)}, z_{i+2}'^{(3)}, z_{i+3}'^{(4)}), i=1,2,3,4, \tag{5}$$

where $$z_{i+4}'^{(j)} = z_i'^{(j)}, j=1,2,3,4 \tag{6}$$

where i represents the subblock number for each 32 bits and j the data number of each byte in the subblock. In FIG. 3 there are shown permutations expressed by Eqs. (5) and (6). The four bytes of each piece of data $z_1$, $z_2$, $z_3$ and $z_4$ are distributed to four different output data groups.

The output from the byte permutation part (that is, the BP function part) 13 is divided to right data $R_0$ and left data $L_0$, which are provided to the round processing stage $RND_1$. The i-th round processing stage $RND_i$ performs substitution-permutation processing of right data $R_{i-1}$ in a round function part 22 by using a subkey $k_i$, and provides the substitution result to an XOR operation part 21, wherein it is exclusive ORed with left data $L_{i-1}$ fed thereto. The right data $R_{i-1}$ input to the i-th stage and the output from the XOR operation part 21 are exchanged in position, and they are provided as left data $L_i$ and right data $R_i$ to the next round processing stage $RND_{i+1}$.

This is expressed as follows:

$$R_i = L_{i-1} \oplus F(R_{i-1}, k_i) \quad (7)$$

$$L_i = R_{i-1}, i=1, 2, \ldots, 12 \quad (8)$$

Each round function part 22 comprises, as depicted in FIG. 2, eight XOR operation parts 22X1, eight S-boxes (S function) 22S1, a linear permutation part (a P function part) 22P, eight XOR operation parts 22X2, and eight S-boxes 22S2. 64-bit right data R is input to the i-th round processing stage $RND_i$. In the round function part 22, setting the input $R_{i-1}$ $$R_{i-1} = (r_1, r_2, r_3, r_4, r_5, r_6, r_7, r_8)$$

$$k_i = (K^{(1)}, K^{(2)}) = (K_1^{(1)}, K_2^{(1)}, \ldots, K_8^{(1)}, K_1^{(2)}, K_2^{(2)}, \ldots, K_8^{(2)})$$

the outputs from the S-boxes 22S1 is given by the following equation:

$$(u_1, u_2, \ldots, u_8) = (s(r_1 \oplus K_1^{(1)}), s(r_2 \oplus K_2^{(1)}), \ldots, s(r_8 \oplus K_8^{(1)})) \quad (9)$$

The output from the linear permutation part 22P can be expressed as follows:

$$u'_1 = u_2 \oplus u_3 \oplus u_4 \oplus u_5 \oplus u_6 \oplus u_7$$

$$u'_2 = u_1 \oplus u_3 \oplus u_4 \oplus u_6 \oplus u_7 \oplus u_8$$

$$u'_3 = u_1 \oplus u_2 \oplus u_4 \oplus u_5 \oplus u_7 \oplus u_8$$

$$u'_4 = u_1 \oplus u_2 \oplus u_3 \oplus u_5 \oplus u_6 \oplus u_8$$

$$u'_5 = u_1 \oplus u_2 \oplus u_4 \oplus u_5 \oplus u_6$$

$$u'_6 = u_1 \oplus u_2 \oplus u_3 \oplus u_6 \oplus u_7$$

$$u'_7 = u_2 \oplus u_3 \oplus u_4 \oplus u_7 \oplus u_8$$

$$u'_8 = u_1 \oplus u_3 \oplus u_4 \oplus u_5 \oplus u_8 \quad (10)$$

The outputs from the S-boxes 22S2 are expressed by the following equation:

$$(v_1, v_2, v_3, v_4, v_5, v_6, v_7, v_8) = (s(u'_1 \oplus K_1^{(2)}), s(u'_2 \oplus K_2^{(2)}), \ldots, s(u'_8 \oplus K_8^{(2)})) \quad (11)$$

These outputs are subjected to byte rotation and then output from the round function part 22.

In the case of FIG. 1, twelve such round processing stages are cascade-connected, and left and right data $L_{12}$ and $R_{12}$ output from the 12-th round processing part $RND_{12}$ are concatenated into 128-bit data, which is fed to a $BP^{-1}$ function part 31 of the final transformation part 30.

The final transformation part 30 obtains, as a ciphertext X=C, X=FT(Z', $k_{15}$, $k_{16}$) from the input thereto $Z'=(z_1', z_2', z_3', z_4')$ and keys $k_{15}$, $k_{16}$. More specifically, the $BP^{-1}$ function part 31 performs inverse processing of the BP function part 13 by the following equation to obtain the output Z.

$$(z_i'^{(1)}, z_i'^{(2)}, z_i'^{(3)}, z_i'^{(4)}) = z_i', i=1, 2, 3, 4$$

$$z_i = (z_i'^{(1)}, z_{i-1}'^{(2)}, z_{i-2}'^{(3)}, z_{i-3}'^{(4)}) i=1,2,3,4 \quad (12)$$

where $z'_{i-4}{}^{(j)} = z'_i{}^{(j)} j=1,2,3,4 \quad (13)$ $$Z = (z_1, z_2, z_3, z_4)$$

The output Z is provided to a division part 32, which performs the division of the following equation using a subkey $k_{15} = (K_1, K_2, K_3, K_4)$.

$$y_i = z_i (K_i \vee 1_{(hex)})^{-1} \mod 2^{32}, i=1,2,3,4 \quad (14)$$

A variable in Eq. (14) is $z_i$ alone. Hence, it is possible to provide increased efficiency of calculation to precalculate and prestore the value of an inverse element $G_i = (K_i \vee 1_{(hex)})^{-1} \mod 2^{32}$ in a memory, since the stored value can be used to calculate $y_i = z_i G_i \mod 2^{32}$ for each input data $z_i$. The calculation result $Y = (y_1, y_2, y_3, y_4)$ is exclusive ORed with a subkey $k_{16}$ in an XOR operation part 33 by the following equation, and the resulting output X is provided as the ciphertext C.

$$C = X = Y \oplus k_{16} \quad (15)$$

FIG. 3 depicts the input/output relationship by the byte permutation using the BP functions expressed by Eqs. (5) and (6). As shown, the four pieces of 4-byte data $z_1$, $z_2$, $z_3$ and $z_4$ are rearranged on a bytewise basis to obtain the four pieces of 4-byte data $z_1'$, $z_2'$, $z_3'$ and $z_4'$. Conventionally, this byte permutation is implemented by performing the operation expressed by the following equation:

$$z_1' = (z_1 \wedge \text{ff000000}) \vee (z_2 \vee \text{00ff0000}) \vee (z_3 \wedge \text{0000ff00})$$
$$\vee (z_4 \wedge \text{000000ff})$$

$$z_2' = (z_2 \wedge \text{ff000000}) \vee (z_3 \vee \text{00ff0000}) \vee (z_4 \wedge \text{0000ff00})$$
$$\vee (z_1 \wedge \text{000000ff})$$

$$z_3' = (z_3 \wedge \text{ff000000}) \vee (z_4 \vee \text{00ff0000}) \vee (z_1 \wedge \text{0000ff00})$$
$$\vee (z_2 \wedge \text{000000ff})$$

$$z_4' = (z_4 \wedge \text{ff000000}) \vee (z_1 \vee \text{00ff0000}) \vee (z_2 \wedge \text{0000ff00})$$
$$\vee (z_3 \wedge \text{000000ff}) \quad (16)$$

where the symbol $\wedge$ represents the AND for each bit and the symbol $\vee$ the OR for each bit and "f" and "0" are hexadecimal values. This operation is performed as depicted in FIG. 4. For the sake of brevity, the entire data $Z = z_i^{(j)}$ (where i=1,2,3,4; j=1,2,3,4) is represented by a sequence of data $a_0, a_1, \ldots, a_{15}$. For example, 4-byte data $z_1$ of a register RG1 and 4-byte mask data MD1 of a mask register MRG1 are ANDed to obtain $z_1 \wedge \text{ff000000}$, which is stored in a register RG1'. Then, the AND of data $z_2$ and mask data MD2, $z_2 \wedge \text{00ff0000}$, is calculated and is ORed with the data read out of the register RG1', and the OR thus obtained is overwritten on the register RG1'. By performing the same processing for mask data MD3 and MD4 as well, the data $z_1'$ is provided in the register RG1'. The same calculation processing as described above is also carried out for the data $z_2'$, $z_3'$ and $z_4'$ by Eq. (16). Thus the byte permutation results are obtained in registers RG1' to RG4'. In the implementation of this calculation scheme, there have been pointed out such problems as mentioned below. That is, the processing by the BP function is byte-byte permutation processing, but a one-word register built in recent CPUs involves masking and shift operations, and hence it consumes much processing time. And, even if the permutation can be made after the ORs are once copied to a memory, the time for memory access inevitably increases, resulting in the processing time increasing. These problems constitute an obstacle to the realization of high-speed performance of the common key cryptosystem.

In the division part 32 in FIG. 1 a precalculated inverse element can be used. In general, it is possible to utilize, for the execution of an inverse element calculation to modulus N, an extended Euclidian algorithm set forth, for instance, in Okamoto and Ohta, coeditors, "Cipher/Zero Knowledge Proof/Number Theory," Kyouritsu Shuppan, 1995, pp.120–121. In the case of Eq. (14), however, since the modulus has a special form of $2^m$, the inverse element can efficiently be calculated by the use of a Hensel Lifting method (a natural method of raising the root of a polynomial from mod $b^m$ to mod $b^{m+1}$). In the calculation of the inverse element with software, when m is about one word length, a Zassenhaus's proposed method which is a quadratic version of the Hensel Lifting (H. Zassenhaus, "On Hensel Factorization, I," Journal of number theory, vol.1, pp.291–311, 1969) is effective because the word multiplication is relatively fast on recent CPUs.

Letting the input be represented by x, the output by y and auxiliary or temporary variables by a and b and letting [x] represent a Gauss symbol (the maximum integer which does not exceed x), the Zassenhaus method provides an algorithm for calculating an inverse $y=x^{-1}$ mod $2^m$ as given below assuming that the bit position is given 0 as the least significant bit and that the bit lengths of x, y, a and b are m, where $m=2^n (n \geq 1)$:

Step 1: Input x.
Step 2: Initialize y:=1 and b:=[x/2]
Step 3: Do the following for i=0, 1, ..., n−1
   1. Set a as low-order $2^i$ bits of $y \times (2^{2^i} - $(low-order $2^i$ bits of b)).
   2. Pad $2^i$-th to $(2^{i+1}-1)$-th bits of y with low-order $2^i$ bits of a.
   3. Store $2^i$-th to $(2^n-2^i-1)$-th bits of xa+b in b.
Step 4: Output y.

This bit processing is such as shown in FIG. 5, in which the contents of the register having stored therein the output y for state changes of i are represented by binary numbers. "1" indicates bits whose value is always 1, "." calculated bits, and "?" unknown bits. In the result with i=2 calculated using i=1, fourth to seventh bits are determined. To arrange data in the fourth to seventh bits will hereinafter be referred to as "padding."

The configuration of the RSA cipher, which is a typical public key cryptosystem, is described, for example, in the above-mentioned literature "Cipher/Zero Knowledge Proof/Number Theory," p.220. The RSA cipher requires a power calculation over Z/NZ, that is, what is called a modular exponentiation. For fast execution of this modular exponentiation, it is effective to use the Montgomery modular arithmetic algorithm introduced in the above-mentioned literature on pages 179–181. The execution of the Montgomery modular arithmetic algorithm involves an inverse calculation in mod $2^m$ using m as a natural number.

The above-mentioned Zassenhaus scheme involves bitwise processing such as extraction and padding of low-order $2^i$ bits and, in the case of software implementation, the masking operation increases, and hence efficiency is not so high.

The round function part 22 of the round processing stage depicted in FIG. 2 is formed by a combination of the substitution by the S function part 22S1 and the permutation by the P function part 22P.

The substitution-permutation is a concept of a considerably broad meaning. To meet a demand for software implementation in recent years, there has widely been used the substitution-permutation in the following form:

$$\begin{bmatrix} y_1 \\ y_2 \\ \vdots \\ y_m \end{bmatrix} = P \begin{bmatrix} s_1(x_1) \\ s_2(x_2) \\ \vdots \\ s_n(x_n) \end{bmatrix} \quad (17)$$

In this instance, operations are all performed over the ring R. The permutation is given by $$P = \begin{bmatrix} p_{11} & p_{12} & \cdots & p_{1n} \\ p_{21} & p_{22} & \cdots & p_{2n} \\ \vdots & \vdots & \ddots & \vdots \\ p_{ml} & p_{m2} & \cdots & p_{mn} \end{bmatrix} \quad (18)$$

and the substitution is set to $s_j: R \rightarrow R (j=1, 2, \ldots, n)$. That is, the product of the matrix is considered as permutation.

The substitution-permutation expressed by Eq. (17) is also used in the cipher SHARK that is defined in V. Rijmen, et al. "The Cipher SHARK," Fast Software Encryption-Third International Workshop, Lecture Notes in Computer Science 1039, pp. 99–111, Springer-Verlag 1996 (hereinafter referred to simply as Literature S). In Literature S there is also described a method in which the following modified equation is used $$\begin{bmatrix} p_{11} & p_{12} & \cdots & p_{1n} \\ p_{21} & p_{22} & \cdots & p_{2n} \\ \vdots & \vdots & \ddots & \vdots \\ p_{ml} & p_{m2} & \cdots & p_{mn} \end{bmatrix} \begin{bmatrix} s_1(x_1) \\ s_2(x_2) \\ \vdots \\ s_n(x_n) \end{bmatrix} = \quad (19)$$

$$\begin{bmatrix} p_{11}s_1(x_1) \\ p_{21}s_1(x_1) \\ \vdots \\ p_{ml}s_1(x_1) \end{bmatrix} + \begin{bmatrix} p_{12}s_2(x_2) \\ p_{22}s_2(x_2) \\ \vdots \\ p_{m2}s_2(x_2) \end{bmatrix} + \cdots + \begin{bmatrix} p_{1n}s_n(x_n) \\ p_{2n}s_n(x_n) \\ \vdots \\ p_{mn}s_n(x_n) \end{bmatrix}$$

and the output value of the function $SP_j$ expressed by the following equation (20) is precalculated corresponding to every $x_j$ and prestored, for example, in a memory to thereby efficiently calculate Eq. (17).

$$SP_j: R \rightarrow R^m; \quad SP_j(x_j) = \begin{bmatrix} p_{1j}s_j(x_j) \\ p_{2j}s_j(x_j) \\ \vdots \\ p_{mj}s_j(x_j) \end{bmatrix} \quad (j = 1, 2, \ldots, n) \quad (20)$$

In the cipher utilizing the substitution-permutation scheme, there is a case where no permutation is performed at the end of processing but only substitution is used. That is, the following processing is also necessary for cipher implementation.

$$\begin{bmatrix} y_1 \\ y_2 \\ \vdots \\ y_n \end{bmatrix} = \begin{bmatrix} s_1(x_1) \\ s_2(x_2) \\ \vdots \\ s_n(x_n) \end{bmatrix} \quad (21)$$

When the size of the element in R is smaller than the word length that is the operation unit in the computer used, it is necessary in straightforward implementation that the calculation of individual values of $s_j(X_j)$ be followed by shifting them to their correct vector positions. In this instance, the necessity for the data position adjustment process can be avoided by Modifying Eq. (21) to $$\begin{bmatrix} y_1 \\ y_2 \\ \vdots \\ \vdots \\ y_n \end{bmatrix} = \begin{bmatrix} s_1(x_1) \\ 0 \\ \vdots \\ \vdots \\ 0 \end{bmatrix} + \begin{bmatrix} 0 \\ s_2(x_2) \\ 0 \\ \vdots \\ 0 \end{bmatrix} + \cdots + \begin{bmatrix} 0 \\ \vdots \\ \vdots \\ 0 \\ s_n(x_n) \end{bmatrix} \quad (22)$$

as is the case with Eq. (17) and by precalculating a table in which the positions of vector elements have been adjusted so that 0s would be provided except at the j-th position.

The calculation for the substitution and permutation described in Literature S is disadvantageous in that it involves a large number of memory references and requires a large memory capacity.

As described previously, letting the input data be ($u_1$, $u_2$, ..., $u_8$) and the output data b ($u_1'$, $u_2'$, ..., $u_8'$), the P function part 22P in the cipher E2 shown in FIG. 2, for instance, performs an operation using the product expressed by the following equation.

$$\begin{bmatrix} u_1' \\ u_2' \\ u_3' \\ u_4' \\ u_5' \\ u_6' \\ u_7' \\ u_8' \end{bmatrix} = P \begin{bmatrix} u_1 \\ u_2 \\ u_3 \\ u_4 \\ u_5 \\ u_6 \\ u_7 \\ u_8 \end{bmatrix}, \quad P = \begin{bmatrix} 0 & 1 & 1 & 1 & 1 & 1 & 1 & 0 \\ 1 & 0 & 1 & 1 & 0 & 1 & 1 & 1 \\ 1 & 1 & 0 & 1 & 1 & 0 & 1 & 1 \\ 1 & 1 & 1 & 0 & 1 & 1 & 0 & 1 \\ 1 & 1 & 0 & 1 & 1 & 1 & 0 & 0 \\ 1 & 1 & 1 & 0 & 0 & 1 & 1 & 0 \\ 0 & 1 & 1 & 1 & 0 & 0 & 1 & 1 \\ 1 & 0 & 1 & 1 & 1 & 0 & 0 & 1 \end{bmatrix} \quad (23)$$

where: $u_i$, $u_j' \in R$

This operation is expressed merely as the product of a matrix and is the same as Eq. (10). In an environment where a permutation operation using masked data or a permutation operation using a bit shift or cyclic shift is possible by processing every 32 bits, the required number of processing steps is small, and hence fast processing can be achieved. However, since such operation processing cannot be performed in a hardware environment formed by an 8-bit accumulator type CPU, a small number of registers and a small amount of memory capacity as in the case of a low-end smart card, the operation of Eq. (10) needs to be executed successively, and hence high-speed processing is difficult to perform.

The following description will be given on the assumption that in an implementation environment formed by one 8-bit accumulator, a small number of registers and a small amount of memory, the input data ($u_1$, $u_2$, ..., $u_8$) is stored in the memory and is read out therefrom, and the permutation output data $u_1'$, $u_2'$, ..., $u_8'$ is calculated and stored in the memory; the computational complexity in this instance is evaluated. The evaluation is made in terms of the number of times an addition/subtraction is performed, the number of times the memory is written and the number of times the memory is read. And let it be assumed that the permutation operation is performed by calculating Eq. (23) using the above-mentioned matrix P.

Conventional scheme 1: If the permutation operation of Eq. (23) is carried out as defined, then Eq. (10) needs to be calculated successively. The computational complexity in this case is as follows:

Number of additions/subtractions: 36

Number of memory reads: 44

Number of memory writes: 8

With this scheme, the number of memory reads is equal to the total number of elements of the matrix P which have a "1" component. Accordingly, the computational complexity increases with an increase in the number of elements whose components are "1s".

Conventional scheme 2: In Literature E2 there is described, as the permutation scheme using the matrix P, a scheme that uses $GF(2^8)$ as the ring R and calculates the following equations.

| | | | |
|---|---|---|---|
| $a_5 = u_5 + u_1$ | $b_1 = u_1 + a_7$ | $u_5' = a_5 + b_4$ | $u_1' = b_1 + u_5'$ |
| $a_6 = u_6 + u_2$ | $b_2 = u_2 + a_8$ | $u_6' = a_6 + b_1$ | $u_2' = b_2 + u_6'$ |
| $a_7 = u_7 + u_3$ | $b_3 = u_3 + a_5$ | $u_7' = a_7 + b_2$ | $u_3' = b_3 + u_7'$ |
| $a_8 = u_8 + u_4$ | $b_4 = u_4 + a_6$ | $u_8' = a_8 + b_3$ | $u_4' = b_4 + u_8'$ |

The computational complexity of this scheme is as follows:

Number of additions/subtractions: 16

Number of memory reads: 32

Number of memory writes: 16

This scheme is more effective than scheme 1 in the case where the number of registers used is large and addition instructions are orthogonal (the addition instructions can be executed for all the registers). However, this scheme has such disadvantages such listed below.

(a) Since the scheme essential utilizes that the characteristic of R is 2, it cannot be used when the characteristic is not 2.

(b) Since a large number of registers cannot be used, this scheme is not always efficient in some implementation environments.

(c) The computational complexity depends largely on the component configuration of the matrix P.

Conventional scheme 3: When the number of "1" components is large as in the case of the matrix P, the following calculation scheme can be used.

$\sigma = u_1 + u_2 + u_3 + u_4 + u_5 + u_6 + u_7 + u_8$ $u_1' = \sigma - u_1 - u_8$ $u_2' = \sigma - u_2 - u_5$ $u_3' = \sigma - u_3 - u_6$ $u_4' = \sigma - u_4 - u_7$ $u_5' = \sigma - u_3 - u_7 - u_8$ $u_6' = \sigma - u_4 - u_5 - u_8$ $u_7' = \sigma - u_1 - u_5 - u_6$ $u_8' = \sigma - u_2 - u_6 - u_7$ The computational complexity of this scheme is as follows:
Number of additions/subtractions: 27
Number of memory reads: 36
Number of memory writes: 9

This scheme is more efficient than scheme 1 when the number of elements of the matrix P having the "1" component accounts for more than 60% of the total number of elements.

In any of the above conventional schemes, the efficiency of the permutation by the matrix P depends on how {0, 1} components of the matrix P are distributed; in particular, the computational complexity is determined by the rate at which the elements of the "1" component are present. That is, there is a possibility that scheme 1 or 3 becomes efficient according to the configuration of the matrix P; hence, these schemes are not versatile. Which of these schemes becomes more efficient depends on whether the number of elements of the matrix P having the "1" component is more than 60% of the total number of elements.

To implement secure permutation that can be used in cryptography, it is desirable that the rates of "0" and "1" components in the matrix P be well balanced. For example, in the case of the above matrix P used for the permutation in the cipher E2, the elements of the "1" component is about ⅔ of the total number of matrix elements. Since this value is close to the point of determining which scheme becomes more efficient, schemes 1 to 3 are almost common in the number of times the memory is read. This means that these conventional schemes produce substantially no effects of increasing the processing speed, because reading from or writing to the memory is several times lower in speed than addition and subtraction; therefore, the implementation of any of the schemes will not answer the intended purpose of faster permutation operation.

SUMMARY OF THE INVENTION

It is an object of the present invention to provide a data permutation method and apparatus which permit fast processing for the permutation of data with the BP function in the cipher E2 and the division of data to left and right pieces in the Feistel network through the use of one-word registers.

Another object of the present invention is to provide an inverse calculating method and apparatus which permit reduction of the number of masking operations involved.

Another object of the present invention is to provide a substitution-permutation method and apparatus which permit reduction of the number of memory reference and the required storage capacity.

Still another object of the present invention is to provide an operation method which permits reduction of computational complexity in the permutation using the matrix P.

According to a first aspect of the present invention, there is provided a data permutation method by which, letting one byte be k-bit, k being an integer equal to or greater than 1, input data of 16 bytes set, in units of four bytes, in 4k-bit long first to fourth registers is permutated, the method comprising the steps of:

(a) ANDing 4-byte first mask data with the data of said first register and 4-byte second mask data with the data of said third register, and ORing the two ANDs as first output data;

(b) ANDing 4-byte third mask data with the data of said second register and 4-byte fourth mask data with the data of said fourth register, and ORing the two ANDs as second output data;

(c) ANDing said second mask data with the data of said first register and said first mask data with the data of said third register, and ORing the two ANDs as third output data;

(d) ANDing said fourth mask data with the data of said second register and said third mask data with the data of said fourth register, and ORing the two ANDs as fourth output data; and (e) outputting said first to fourth data as permutated data; wherein all bits of predetermined two of four bytes of said first mask data are "1s," all bits of the remaining two bytes are "0s," said second mask data is complementary to said first mask data, said third mask data is a 1-byte-rotated version of said first mask data, and said fourth mask data is complementary to said third mask data.

Alternatively, according to a first aspect of the present invention, there is provided a data permutation method by which, letting one byte be k-bit, k being an integer equal to or greater than 1, input data of 16 bytes set, in units of four bytes, in 4k-bit long first to fourth registers is permutated, the method comprising the steps of:

(a) rotating the data of said first and third registers one byte in one direction, and concatenating them to form first concatenated data;

(b) concatenating the data of said second and fourth registers to form second concatenated data;

(c) shifting said first and second concatenated data two bytes in one direction, and extracting, as first and second output data, two pieces of 4-byte data from said shifted first and second concatenated data at one end thereof in the shift direction;

(d) concatenating said rotated data of said third and first registers to form third concatenated data;

(e) concatenating the data of said fourth and second registers to form fourth concatenated data;

(f) shifting said third and fourth concatenated data two bytes in one direction, and extracting, as third and fourth output data, two pieces of 4-byte data from said shifted third and fourth concatenated data at one end thereof in the shift direction; and (g) outputting said first to fourth output data as permutated data.

According to a second aspect of the present invention, there is provided an inverse calculating apparatus comprising:

input means for storing an input x in storage means;

storage means for storing integers n and i (where n is equal to or greater than 1) and $2^n$-bit integers x, y, a and b;

first b-initialization means for calculating [x/2] by using said x stored in said storage means (where [x] is the maximum integer not exceeding said x), and for storing the calculation result as b in said storage means;

a-initialization means for storing, as said a, in said storage means the least significant bit of said b stored in said storage means;

second b-initialization means for calculating [(ax+b)/2] by using said a, x and b stored in said storage means and for updating said b stored in said storage means with the calculation result;

y-updating means for calculating $y+a \times 2^{(2^i)}$ using said a, y and i stored in said storage means and updating said y stored in said storage means with the calculation result (where p^q represents the q-th power of p);

i-updating means for updating said i stored in said storage means to i+1;

a-updating means for calculating −by by using said b and y stored in said storage means and for updating said a stored in said storage means with the calculation result;

b-updating means for calculating $[(b+ax)/(2^{\wedge}(2^i))]$ by using a, b, x and i stored in said storage means and for updating said b stored in said storage means;

y-updating means for calculating $y+a\times 2^{\wedge}(2^i)$ by using said a, y and i stored in said storage means and for updating said y stored in said storage means with the calculation result;

i-updating means for updating said i stored in said storage means to i+1;

control means for reading out said i and n stored in said storage means and actuating said a-updating means, said b-updating means, said y-updating means and said i-updating means one after another until i=n; and output means for outputting said y stored in said storage means.

According to a third aspect of the present invention, there is provided a substitution-permutation apparatus which, by the following substitution-permutation over a ring R $$\begin{bmatrix} y_1 \\ y_2 \\ \vdots \\ y_m \end{bmatrix} = P \begin{bmatrix} s_1(x_1) \\ s_2(x_2) \\ \vdots \\ s_n(x_n) \end{bmatrix} \text{ where } P = \begin{bmatrix} p_{11} & p_{12} & \cdots & p_{1n} \\ p_{21} & p_{22} & & p_{2n} \\ \vdots & & & \vdots \\ p_{m1} & p_{m2} & \cdots & p_{mn} \end{bmatrix}$$

$$p_{ij} \in R, \quad s_j: R \to R \quad i=1,2,\cdots,m \quad j=1,2,\cdots,n$$

performs a substitution-permutation operation of an input data sequence ($x_j$) to calculate a data sequence ($y_i$), said apparatus comprising:

storage means for storing: precalculated values of $v_i$ (whose dimensions are up to m and may differ individually) over said ring R necessary for said substitution-permutation, obtained by swapping rows or columns of said matrix P for some $p_{ij}$ or $s_j$ of the same values; a precalculated value of a function $S_k: R \to R^m$; precalculated values of n vectors $w_k \in R^m$; and an integer k;

input means for storing said input data sequence $x_j$ in said storage means;

k-initialization means for setting said integer k to 0;

k-updating means for updating said k in said storage means to k+1;

$S_k$ calculating means for reading out each $S_k$ and input data ($x_k$) from said storage means to obtain the result of calculation of a vector $S_k(x_k)$ and for storing said vector as a vector $w_k$ in said storage means;

$u_k$-generating means for reading out of said storage means a set of vectors $\{v_1\}$ necessary for forming a k-th column of said matrix P and for generating a vector $u_k$;

$u_k * S_k$ calculating means for reading out said $w_k$ from said storage means and calculating the product for each element and for updating said $w_k$ with the calculation result;

control means for reading out said k stored in said storage means and for actuating said $S_k$ calculating means, said $u_k * S_k$ calculating means and said k-updating means one after another until k=n; and output means for reading out each $w_k$ stored in said storage means and for calculating and outputting their sum.

Alternatively, according to a third aspect of the present invention, a substitution-permutation apparatus which, by the following substitution-permutation over a ring R $$\begin{bmatrix} y_1 \\ y_2 \\ \vdots \\ y_m \end{bmatrix} = P \begin{bmatrix} s_1(x_1) \\ s_2(x_2) \\ \vdots \\ s_n(x_n) \end{bmatrix} \text{ where } P = \begin{bmatrix} p_{11} & p_{12} & \cdots & p_{1n} \\ p_{21} & p_{22} & & p_{2n} \\ \vdots & & & \vdots \\ p_{m1} & p_{m2} & \cdots & p_{mn} \end{bmatrix}$$

$$p_{ij} \in R, \quad s_j: R \to R \quad i=1,2,\cdots,m \quad j=1,2,\cdots,n$$

performs a substitution-permutation operation of an input data sequence ($x_j$) to produce a data sequence ($y_i$), comprisies:

storage means for storing a precalculated value of the following equation with rows of a matrix P rearranged $$SP_{1j}(x_j) = \begin{bmatrix} p_{t(ql)j} s_j(x_j) \\ p_{t(ql+1)j} s_j(x_j) \\ \vdots \\ p_{t(rl)j} s_j(x_j) \end{bmatrix}$$

(where b(j) is a natural number equal to or greater than 1 but equal to or smaller than m, l=1, 2, ..., b(j), t:{1, 2, ..., m}→{1, 2, ..., m} is permutation, and ql and rl are natural numbers equal to or greater than 1 but equal to or smaller than n, ql≦rl) together with precalculated values of n vectors $w_k \in R^m$ and an integer k;

input means for storing said input data sequence ($x_j$) in said storage means;

k-initialization means for setting said integer k to 0;

k-updating means for updating said k stored in said storage means to. k+1;

$SP_k$ calculating means for reading out input data $x_k$ and $SP_{lj}(x_k)$ from said storage means, for calculating said $SP_{lj}(x_k)$ for each l (where l=1, 2, ..., b(j)) and concatenating the calculated results in correspondence to a k-th column of said rearranged matrix P to obtain an m-dimensional vector, and: for updating said $w_k$ stored in said storage means with said m-dimensional vector as $w_k$;

control means for reading out said k stored in said storage means and for actuating said $SP_k$ calculating means and said k-updating means one after the other until k=n; and output means for reading out each $w_k$ stored in said storage means and for calculating and outputting their sum.

According to a fourth aspect of the present invention, there is provided a permutation method in which an operating apparatus including an accumulator type CPU and registers is used to permute input data $u_1, u_2, \ldots, u_n$ by the following equation using an m by n matrix P of predetermined {0, 1} elements to obtain permuted data ($u_1', u_2', \ldots, u_m'$)

$$\begin{bmatrix} u_1' \\ u_2' \\ \vdots \\ u_n' \end{bmatrix} = P \begin{bmatrix} u_1 \\ u_2 \\ \vdots \\ u_n \end{bmatrix}$$

said method comprising the steps of:

(a) setting each piece of said permuted data $u_j'$ by the following equation using already calculated $u_i'$ $$u_j' = u_i' + D_i$$

where j≠i, and j are integers equal to or greater than 1 and equal to or smaller than n, n is an integer equal to or greater than 2 and $D_i$ is given by the difference $D_i=u_j'-u_i'$ between said permuted data $u_j'$ and $u_i'$ defined by said matrix P using said input data $u_1, u_2, \ldots, u_n$; and (b) calculating said $u_j'$ for all of said j.

BRIEF DESCRIPTION OF THE DRAWINGS

FIG. 5 is a diagram depicting the register contents in the case of performing an inverse calculation by a conventional method in a division part 32 in FIG. 1;

DETAILED DESCRIPTION OF THE PREFERRED EMBODIMENTS

Embodiment 1

A description will be given first of the procedure by the present invention which facilitates the operation in the byte permutation part, that is, the BP function part 13 in FIG. 1 in the cipher E2. In the following description, 16 pieces of input k-bit byte data will be identified as $a_0, a_1, \ldots a_{15}$, and permuted output data as $A_1, A_2, A_3, A_4$. The BP function part 13 is supplied with 16 pieces of 1-byte input data $a_0, a_1, \ldots, a_{15}$ and outputs byte-permutated data as right and left data. In this embodiment the arrangement of output data is appropriately chosen and the permutation for rearranging the data as chosen is performed by a procedure involving a smaller number of steps than in the prior art.

Figure 1:
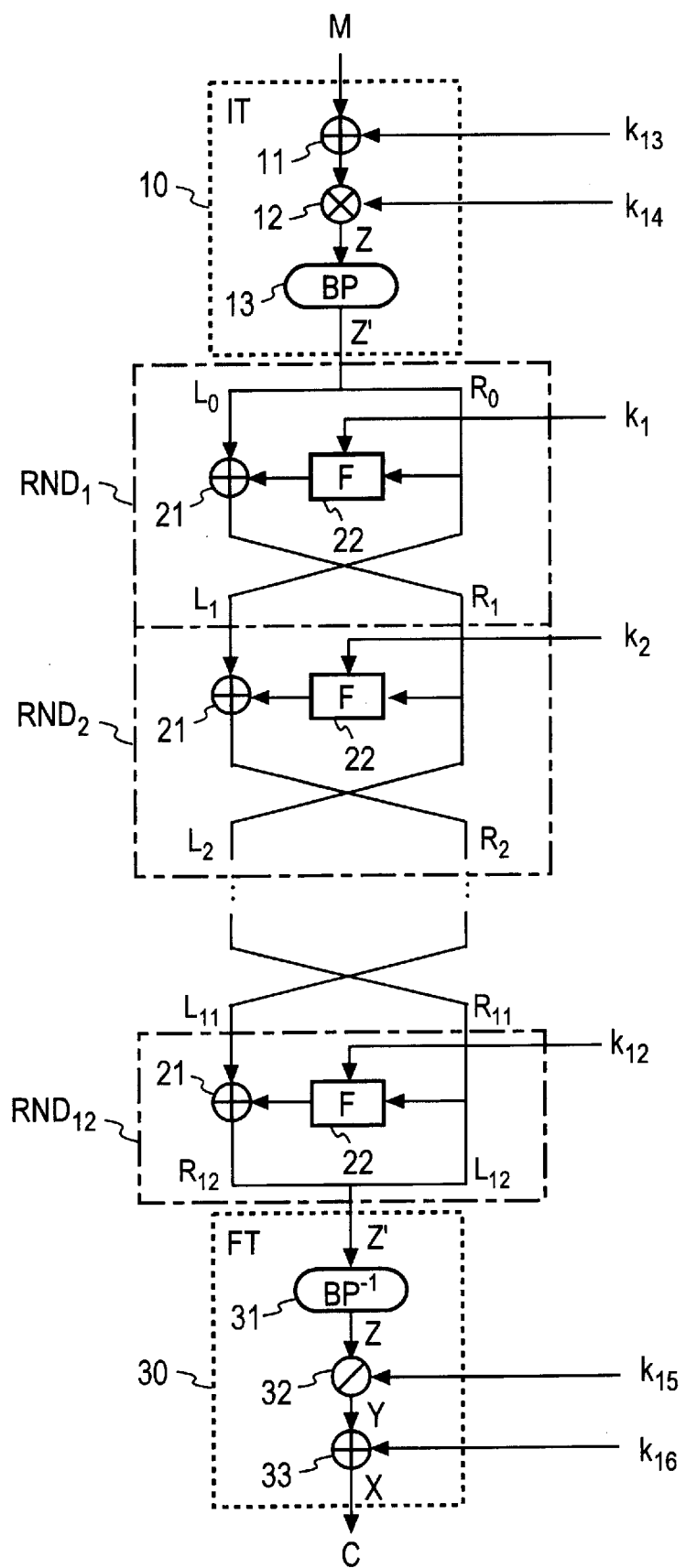
FIG. 1 is a block diagram illustrating the configuration of an E2 cryptographic device that is an example of application of the present invention.
Figure 8:
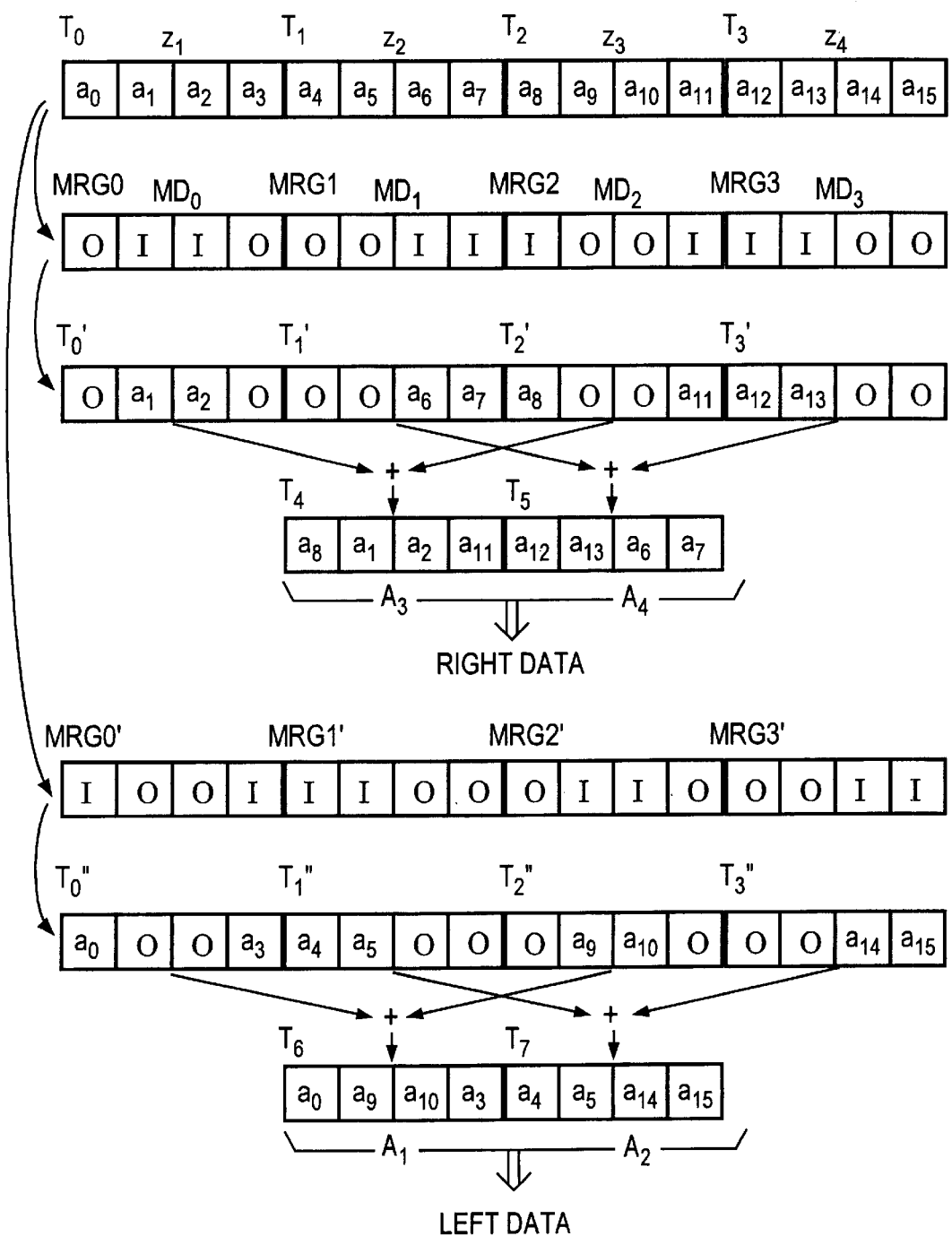
FIG. 8 is a diagram depicting the procedure which is followed in performing the byte permutation of FIG. 6 by a logical operation using mask data.

In this embodiment, the four pieces of data $\{a_{4i+j}\}$ (where $0 \leq j \leq 3$) are stored as $a_{4i+0}, a_{4i+1}, a_{4i+2}, a_{4i+3}$ in each 4k-bit register $T_i$ (where i=0, 1, 2, 3) shown in FIG. 8; the four pieces of data are included in 16 pieces of k-bit data $\{a_{4i+j}\}$ (where $0 \leq i \leq 3, 0 \leq j \leq 3$) which are input into the BP function part 13 (FIG. 1). The data stored in this form will hereinafter be described as follows:

$$T_i=[a_{4i+0}a_{4i+1}a_{4i+2}a_{4i+3}] \tag{24}$$

The left data set [L] and the right data set [R] at the output of the BP function part 13 are defined in the cipher E2 as follows:

$$[L] = \{a_{4(i+j\bmod 4)+j} \mid 0 \leq i \leq 1, 0 \leq j \leq 3\} \tag{25A}$$
$$= \{a_0, a_3, a_4, a_5, a_9, a_{10}, a_{14}, a_{15}\}$$

$$[R] = \{a_{4(i+j\bmod 4)+j} \mid 2 \leq i \leq 3, 0 \leq j \leq 3\} \tag{25B}$$
$$= \{a_1, a_2, a_6, a_7, a_8, a_{11}, a_{12}, a_{13}\}$$

This embodiment also performs the permutation and division of data accordingly. Incidentally, in the specification of the cipher E2, it does not matter even if the right and left data sets differ in the order of 8-byte data; hence, in the present invention, the order of data in either of the right and left data sets is chosen as to achieve the intended reduction of the computationaal complexity in the permutation using masking operations and in the permutation using shift operations.

Figure 3:
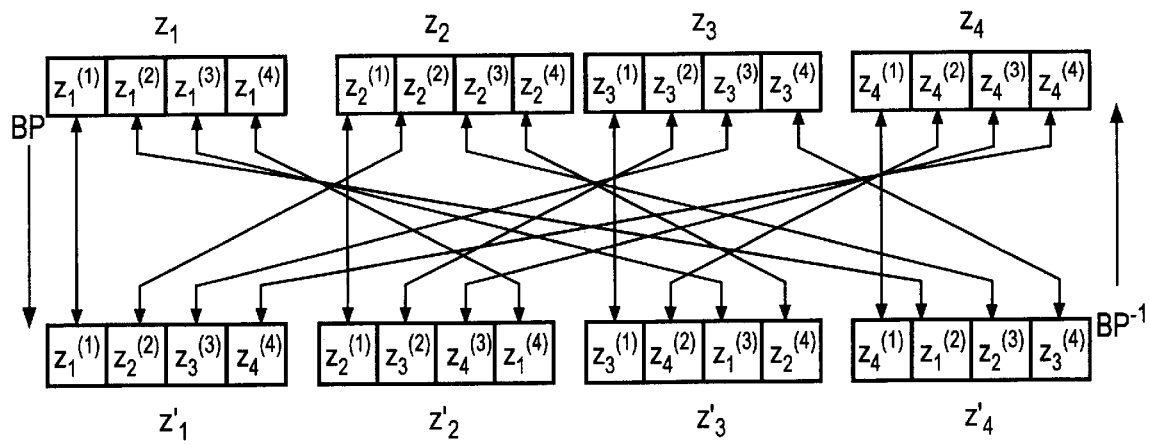
FIG. 3 is a diagram depicting the relationship between data arrangements before and after permutation by a byte permutation part 13 in FIG. 1.
Figure 4:
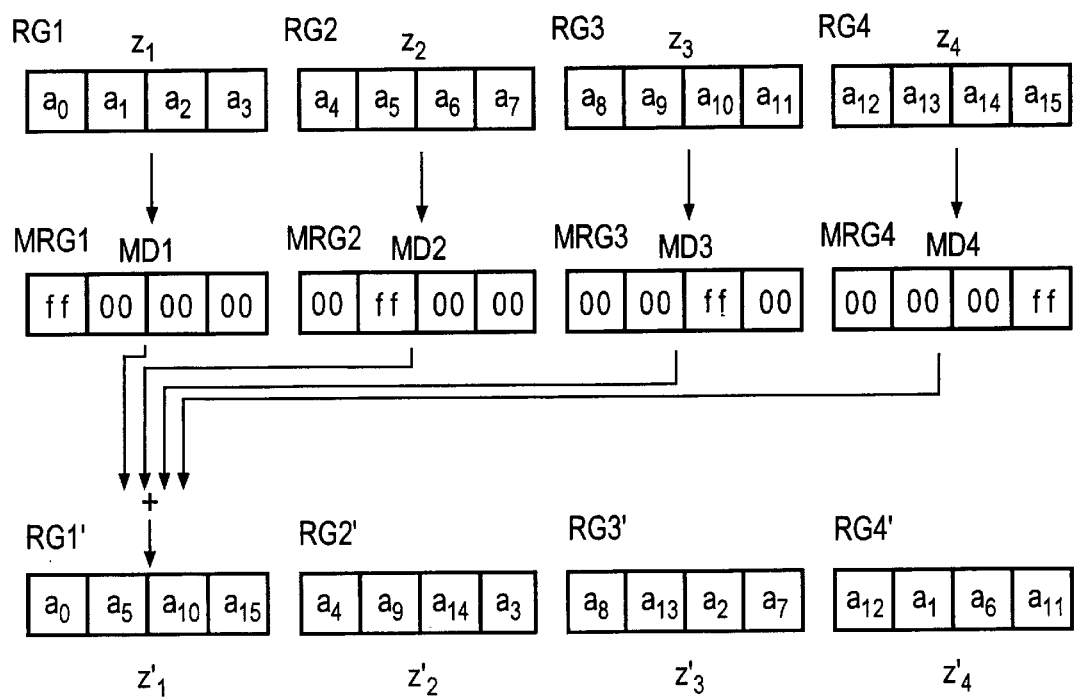
FIG. 4 is a diagram for explaining the procedure by which the permutation of FIG. 3 is performed by a logical operation using mask data.
Figure 6:
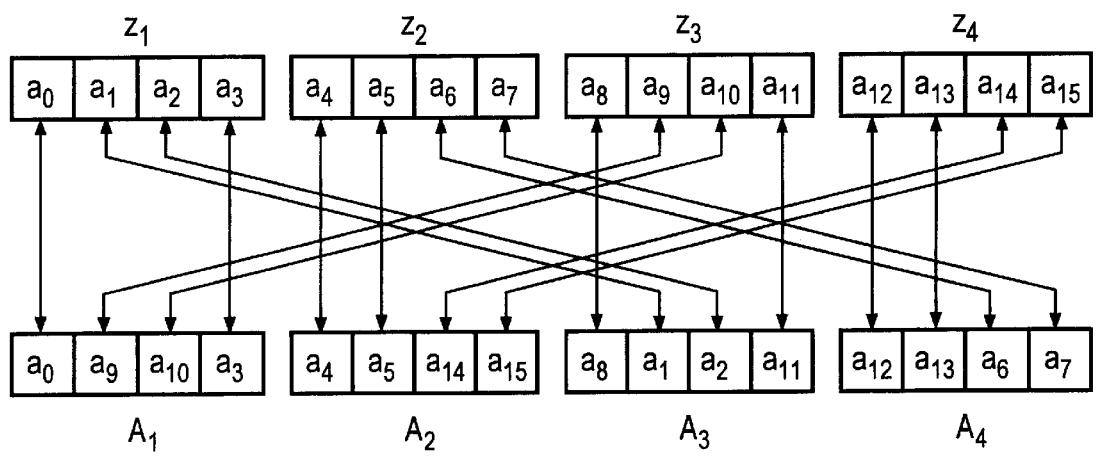
FIG. 6 is a diagram showing an example of the byte permutation by the present invention.
Figure 7:
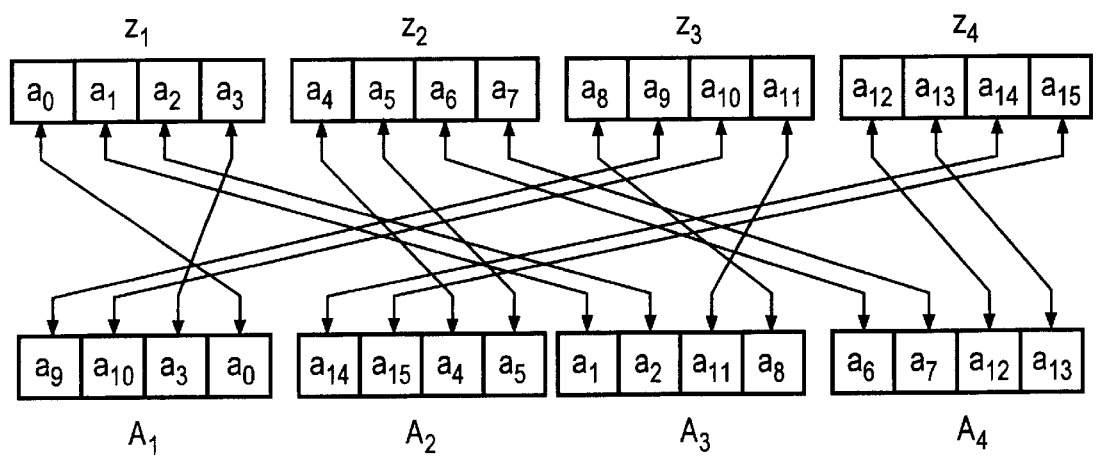
FIG. 7 is a diagram showing another example of the byte permutation by the present invention.

The input 16-byte data $a_0, a_1, \ldots, a_{15}$ is rearranged not on such a byte-by-byte basis as depicted in FIG. 3 but, for example, every two bytes as depicted in FIG. 6 or 7. This permits reduction of procedure steps as described below.

In this embodiment, 1 byte is k-bit and k can be implemented by an arbitrary integer; but k is set at 8 for the sake of brevity. In the following description, let it be assumed that pieces of data "O" and "I" represent binary numbers "00000000" and "11111111," respectively. They will also be denoted by "00" and "ff" in the hexadecimal notation.

FIG. 8 depicts the procedure by which the byte permutation shown in FIG. 6 is performed using mask data. The registers $T_0, T_1, \ldots, T_3$ are 4k-bit; long registers, which are used to permute and divide 16 pieces of k-bit data $\{a_{4i+j}\}$ ($0 \leq i \leq 3, 0 \leq j \leq 3$) into a set $\{a_{4(i+j \bmod 4)+j}\}$ ($0 \leq i \leq 1, 0 \leq j \leq 3$) and a set $\{a_{4(i+j \bmod 4)+j}\}$ ($2 \leq i \leq 3, 0 \leq j \leq 3$) as described below.

Step 1: Data $\{a_{4i+j}\}$ (i=0,1,2,3; j=0,1,2,3) is stored in each register $T_i$. Data (O, $a_1, a_2$, O) obtained by ANDing the value ($a_0, a_1, a_2, a_3$) of the register $T_0$ and mask data $MD_0=(2^{3k}-2^k)=$(O, I, I, O) of a mask register MRG0 is stored in a register $T_0'$; data ($a_8$, O, O, $a_{11}$) obtained by ANDing the value ($a_8, a_9, a_{10}, a_{11}$) of the register $T_2$ and mask data $MD_2=(2^{4k}-2^{3k}+2^k-1)=$(I, O, O, I) of a mask register MRG2 is stored in a register $T_2'$; and the value ($a_8, a_1, a_2, a_{11}$) obtained by ORing the values of the registers $T_0'$ and $T_2'$ is stored in a register $T_4$.

Step 2: Data (O, O, $a_6, a_7$) obtained by ANDing the value ($a_4, a_5, a_6, a_7$) of the register $T_1$ and mask data $MD_1=(2^{2k}-1)=$(O, O, I, I) of a mask register MRG1 is stored in a register $T_1'$; data ($a_{12}, a_{13}$, O, O) obtained by ANDing the value ($a_{12}, a_{13}, a_{14}, a_{15}$) of the register $T_3$ and mask data $MD_3=(2^{4k}-2^{2k})=$(I, I, O, O) of a mask register MRG3 is stored in a register $T_3'$; and the value ($a_{12}, a_{13}, a_6, a_7$) obtained by ORing the values of the registers $T_1'$ and $T_3'$ is stored in a register $T_5$.

Step 3: Data $(a_0, 0, 0, a_3)$ obtained by ANDing the value $(a_0,a_1,a_2,a_3)$ of the register $T_0$ and mask data $(2^{4k}-2^{3k}+2^k-1)=(I, O, O, I)$ of a mask register MRG0' is stored in a register $T_0''$; data $(0, a_9, a_{10}, 0)$ obtained by ANDing the value $(a_8,a_9a_{10},a_{11})$ of the register $T_2$ and mask data $(2^{3k}-2^k)=(O, I, I, O)$ of a mask register MRG2' is stored in a register $T_2''$; and the OR $(a_0,a_9,a_{10},a_3)$ of the values of the registers $T_0''$ and $T_2''$ is stored in a register $T_6$.

Step 4: Data $(a_4, a_5, 0, 0)$ obtained by ANDing the value $(a_4,a_5,a_6,a_7)$ of the register $T_1$ and mask data $(2^{4k}-2^{2k})=(I, I, O, O)$ of a mask register MRG1' is stored in a register $T_1''$; data $(0, 0, a_{14}, a_{15})$ obtained by ANDing the value $(a_{12},a_{13},a_{14},a_{15})$ of the register $T_4$ and mask data $(2^{2k}-1)=(O, O, I, I)$ of a mask register MRG3' is stored in a register $T_3''$; and the OR $(a_4,a_5,a_{14},a_{15})$ of the values of the registers $T_1''$ and $T_3''$ is stored in a register $T_7$.

Step 5: The pieces of data of the two register groups $T_6$–$T_7$ and $T_4$–$T_5$ are output as left and right pieces of data.

The permutation processing using mask data as described above can be expressed by the following logical operation, in which the data is represented in hexadecimal.

$$A_1=(z_1 \wedge \text{ff0000ff}) \vee (z_3 \wedge \text{00ffff00})$$
$$A_2=(z_2 \wedge \text{ffff0000}) \vee (z_4 \wedge \text{0000ffff})$$
$$A_3=(z_3 \wedge \text{ff0000ff}) \vee (z_1 \wedge \text{00ffff00})$$
$$A_4=(z_4 \wedge \text{ffff0000}) \vee (z_2 \wedge \text{0000ffff}) \quad (26)$$

As is evident from the above equation, the numbers of AND and OR operations using mask data involved in obtaining the permuted outputs $A_1,A_2,A_3,A_4$ are eight and four, which are smaller than in the prior art example described previously with reference to Eq. (16).

Figure 9:
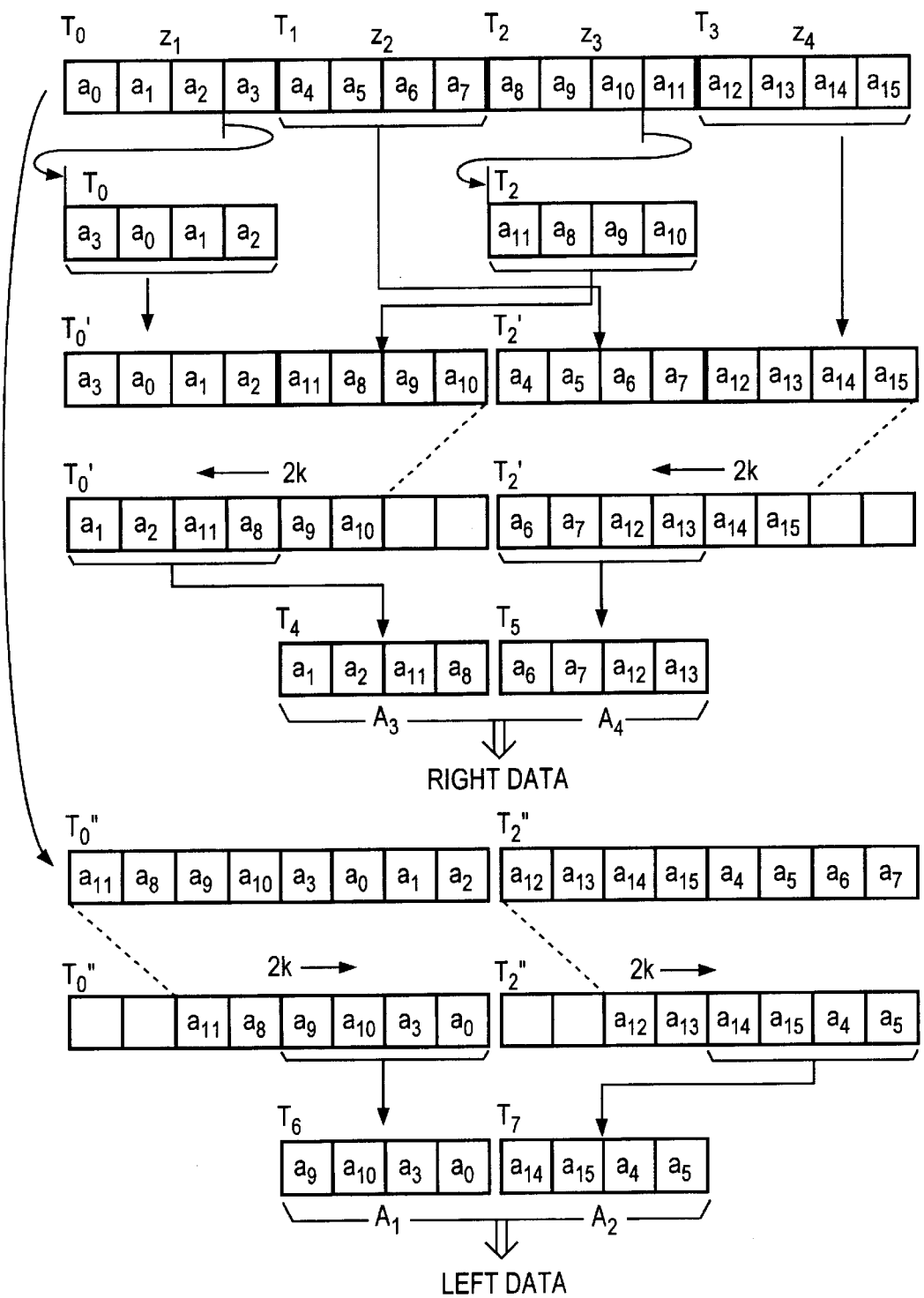
FIG. 9 is a diagram depicting the procedure which is followed in performing the byte permutation of FIG. 7 by a bit shift and a cyclic shift.

FIG. 9 depicts the procedure for the permutation shown in FIG. 7. In the FIG. 7 example, too, each piece of 4-byte data is rearranged in units of two bytes. This permutation is carried out as depicted in FIG. 9 using, for instance, shift and cyclic shift (i.e., rotation) techniques.

Each register $T_i$ is 4k-bit long and k=8 in this example, too. This is a data permutation-division method which permute and divide 16 pieces of k-bit data $\{a_{4i+j}\}$ ($0 \leq i \leq 3$, $0 \leq j \leq 3$) into a set $\{a_{4(i+j \mod 4)+j}\}$ ($0 \leq i \leq 1, 0 \leq j \leq 3$) and a set $\{a_{4(i+j \mod 4)+j}\}$ ($2 \leq i \leq 3, 0 \leq j \leq 3$).

Step 1: The data $\{a_{4i+j}\}$ ($0 \leq i \leq 3, 0 \leq j \leq 3$) is stored in each register $T_i$(i=0, 1,2,3).

Step 2: The values of $(a_0,a_1,a_2,a_3)$ and $(a_8,a_9,a_{10},a_{11})$ of the registers $T_0$ and $T_2$ are rotated k-bit in one direction, in this example, to right.

Step 3: The registers $T_0$ and $T_2$ are concatenated into an apparently 8k-bit long register $T_0'$; its data is shifted left 2k bits and then 4k-bit data $(a_1,a_2,a_{11},a_8)$ extracted from the register at the end in the shift direction is stored in the register $T_4$. The registers $T_1$ and $T_3$ are concatenated into an apparently 8k-bit long register $T_2'$; its data is shifted left 2k bits and then 4k-bit data $(a_6,a_7,a_{12},a_{13})$ extracted from the register at the end in the shift direction is stored in the register $T_5$.

Step 4: The registers $T_2$ and $T_0$ are concatenated into an apparently 8k-bit long register $T_0''$; its data is shifted right 2k bits and then 4k-bit data $(a_9,a_{10},a_3,a_0)$ extracted from the register at the end in the shift direction is stored in the register $T_6$. The registers $T_3$ and $T_1$ are concatenated into an apparently 8k-bit long register $T_2''$; its data is shifted right 2k bits and then 4k-bit data $(a_{14},a_{15},a_4,a_5)$ extracted from the register at the end in the shift direction is stored in the register $T_7$.

Step 5: The pieces of data $A_1$, $A_2$ and $A_3$, $A_4$ of the two register groups $T_6$–$T_7$ and $T_4$–$T_5$ are output as left and right pieces of data.

In the example of FIG. 9, the same results are obtained irrespective of the shift direction in steps 3 and 4. When the direction of rotation is reversed in step 2, the resulting pieces of data are the same as in the case where the contents of the registers $T_4$ and $T_6$ are exchanged, thus achieving similar permutation-division.

The processing depicted in FIG. 9 can be expressed by the following operation, in which the following definitions are used.

$x<<b$: b-bit left shift of $x$ $x>>b$: b-bit right shift of $x$ $ROL(x,y)=(x<<b) \vee (x>>(w-k))$, where $w$ is the number of bits of $x$.

$ROR(x,b)=(x>>b) \vee (x>>(w-b))$, where $w$ is the number of bits of $x$.

$SHLD(x,y,b)=(x<<b) \vee (y>>(w-b))$, where $w$ is the number of bits of $y$.

$SHRD(x,y,b)=(x>>b) \vee (y<<(w-b))$, where $w$ is the number of bits of $y$.

$$A_1=SHRD(ROR(z_3,k),ROR(z_1,k),2k)$$
$$A_2=SHRD(z_4,z_2,2k)$$
$$A_3=SHLD(ROR(z_1,k),ROR(z_3,k),2k)$$
$$A_4=SHLD(z_2,z_4,2k) \quad (27)$$

With this method, the permuted results $A_1,A_2,A_3,A_4$ obtained by two cyclic shifts and four concatenated shifts.

The byte permutation could also be performed by the combined use of the first-mentioned method (utilizing mask data) and the second-mentioned method (utilizing bit shift and cyclic shift). For example, in the first method, the second method may be used to calculate $A_2$ and $A_4$ in Eq. (26) by the following equation:

$$A_2=SHRD(z_4,z_2,2k)$$
$$A_4=SHLD(z_2,z_4,2k) \quad (28)$$

Also it is possible to use the second method to calculate $A_1$ and $A_3$ in Eq.(26) by the following equation:

$$A_1=SHRD(ROR(z_3,k), ROR(z_1,k),2k)$$
$$A_3=SHLD(ROR(z_1,k), ROR(z_3,k),2k) \quad (29)$$

Conversely, in the method using Eq. (27), the first method may also be used to calculate $A_2$ and $A_4$ by the following equation:

$$A_2=(z_4 \wedge \text{0000ffff}) \vee (z_2 \wedge \text{ffff0000})=(a_4,a_5,a_{14},a_{15})$$
$$A_4=(z_2 \wedge \text{0000ffff}) \vee (z_4 \wedge \text{ffff000})=(a_{12}a_{13}, a_6,a_7) \quad (30)$$

It is also possible to use the first method to calculate $A_1$ and $A_3$ in Eq. (27) by the following equation:

$$A_1=(z_3 \wedge \text{00ffff00}) \vee (z_1 \wedge \text{ff0000ff})=(a_0,a_9,a_{10},a_3)$$
$$A_3=(z_1 \wedge \text{00ffff00}) \vee (z_3 \wedge \text{ff0000ff})=(a_9,a_1,a_2,a_{11}) \quad (31)$$

The above byte permutation method is also applicable to the $BP^{-1}$ function part (FIG. 1) that performs inverse processing. For example, when the permutation shown in FIG. 6 is performed in the BP function part 13, the inverse processing needs only to be carried out by the following equation:

$$z_1=(A_1 \wedge \text{ff0000ff}) \vee (A_3 \wedge \text{00ffff00})$$
$$z_2=(A_2 \wedge \text{ffff0000}) \vee (A_4 \wedge \text{0000ffff})$$
$$z_3=(A_3 \wedge \text{ff0000ff}) \vee (A_1 \wedge \text{00ffff00})$$
$$z_4=(A_4 \wedge \text{ffff0000}) \vee (A_2 \wedge \text{0000ffff}) \quad (32)$$

Similarly, when the permutation of FIG. 7 has been carried out, the inverse processing is done by the following equation:

$$z_1 = ROL(SHLD(A_1, A_3, 2k), k)$$

$$z_2 = SHLD(A_2, A_4, 2k)$$

$$z_3 = ROL(SHRD(A_1, A_3, 2k), k)$$

$$z_4 = SHRD(A_2, A_4, 2k) \quad (33)$$

All of the ORs in the above-described first embodiment may also be replaced with additions or XORs.

Figure 10:
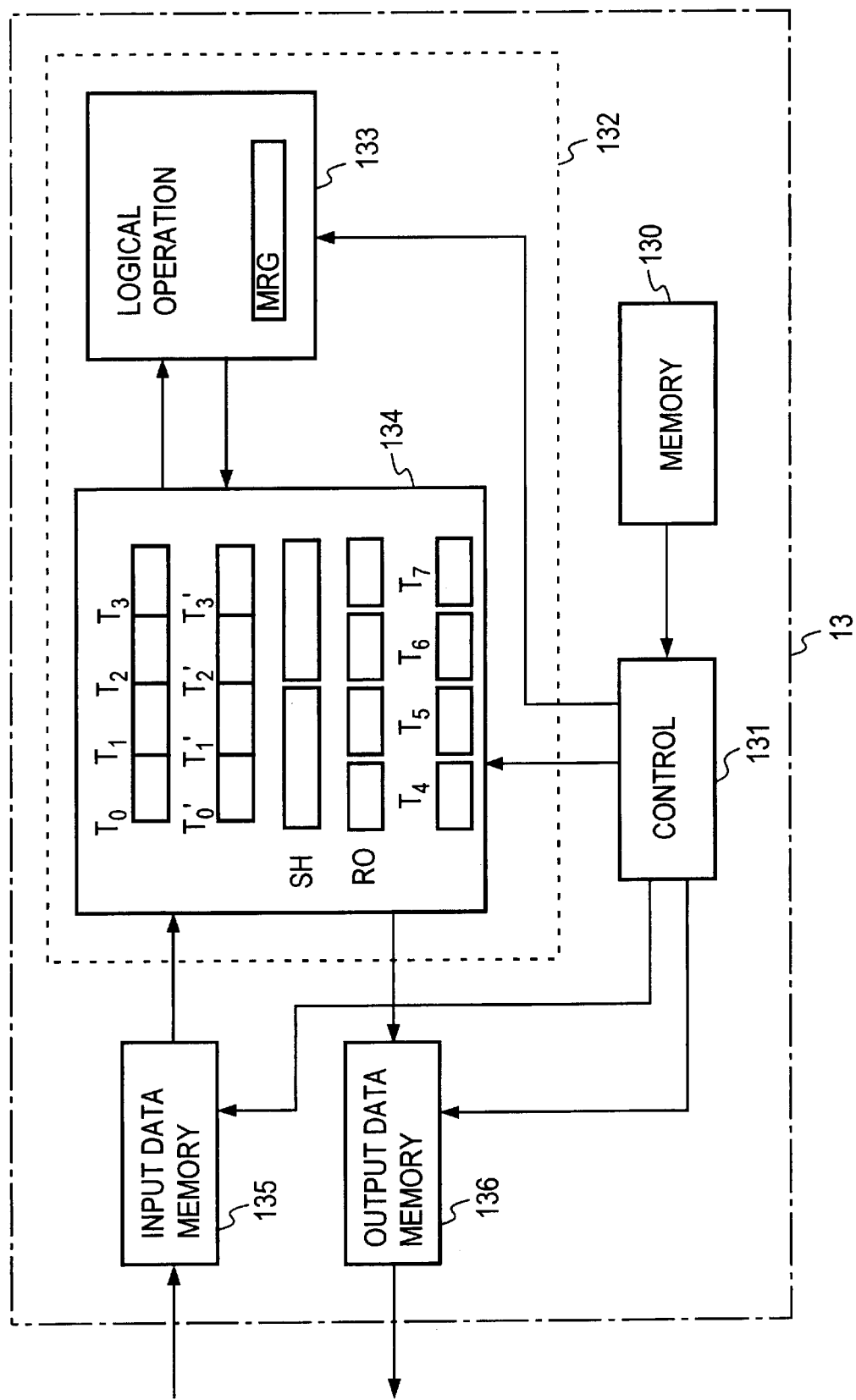
FIG. 10 is a block diagram depicting the configuration of a byte permutation part 13.

FIG. 10 illustrates in block form the BP function part 13 that performs the permutation depicted in FIG. 8 or 9. A control part 131 controls respective processing parts following a byte permutation execution program prestored in a memory 130. In an input data storage part 135 there is held input data $\{a_{4i+j}\}$ ($0 \leq i \leq 3, 0 \leq j \leq 3$), which is set in registers $T_0$ to $T_3$ in a register part 134 of an operation processing part 132 under the control of the control part 131. The control part 131 follows the permutation executing program to issue register data shift and rotation instructions to predetermined registers SH and RO, controls the data transfer between each shift register and a logical operation part 133, and issues to the latter operation instructions for ORing, ANDing and other logical operations and an instruction for the use of mask data of the mask register MRG in such logical operations. The permuted data is transferred from registers $T_4$, $T_5$, $T_6$ and $T_7$ of the register part 134 to an output data storage part 136, from which it is output as right and left data.

As depicted in FIG. 3, according to the specification of the cipher E2, the 4 bytes retained in each register of the input part will each be distributed to one of the four registers of the output part when the input data to the BP function part is stored in units of 4 bytes in the four registers from left to right. In the case of an instruction which is used to perform an operation for one register and store therein the operation result as in ordinary MPUs, only one byte can be processed for one instruction; hence, at least 16 instructions are needed to perform the permutation depicted in FIG. 3. In practice, more than 16 instructions are required to perform masking, ORing and other logical operations.

It is considered that 16 instructions may sometimes be enough when each byte of the registers is used directly as an instruction; in this case, however, some MPUs incur a penalty attributable to their configuration, resulting in the processing time becoming longer than in the case of using 16 instructions as usual. Also it is possible to use a method in which input data once written in a memory is read out therefrom and into the BP function part on a byte-wise basis for the permutation therein. In recent MPUs, however, access to the memory causes a penalty in many cases, and in some cases the penalty occurs owing to the MPU configuration as in the above; in these instances, too, the processing time becomes longer than those needed to execute 16 instructions.

In contrast thereto, according to the present invention, the operation procedure by Eq. (27) enables the byte permutation in the cipher E2 to be performed by two rotate instructions and four instruction for shifting right or left the data of the two concatenated registers and for storing the right or left data concerned in a predetermined register. The instructions for latter half processing are standard with, for example, Intel 80386 MPU or later, and hence they can be implemented without any problems. Accordingly, this invention method permits faster processing of the BP function operation than the existing methods.

In an MPU on which such instructions are not concretely implemented, they can be substituted with two masking instructions and one ORing instruction. That is, while in the above the permuted data $A_1$ in Eq. (27) has been described to be calculated by the processing in which the registers $T_2$ and $T_0$ after the cyclic shift are concatenated into a virtually 8k-bit long register $T_0''$ and the data of the rightmost 4k-bit data of the register $T_0''$ after the 2k-bit right shift is stored as the data $A_1$ of the register $T_6$, the permuted data $A_1$ can also be obtained by such processing as indicated by Eq. (31), in which data (O, $a_9$, $a_{10}$, O) obtained by ANDing data $Z_3$ of the register $T_2$ and mask data $(2^{3k} - 2^k)$=(00ffff00) is stored in a register $T_1''$ (not shown), data ($a_0$, O, O, $a_3$) obtained by ANDing data $z_1$ of the register $T_0$ and mask data $(2^{4k} - 2^{3k} + 2^k - 1)$=(ff0000ff) is stored in a register $T_3''$ (not shown) and the value ($a_0$, $a_9$, $a_{10}$, $a_3$) obtained ORing the data of the register $T_1''$ and the data of the register $T_3''$ is stored in the register $T_6$. The operation for the data $A_3$ in Eq. (31) can also be made in a similar way. The operation does not involve the execution of any cyclic shift instruction, and hence it can be described by a total of 12 instructions, ensuring faster operation of the BP function than does the prior art.

Incidentally, the value $A_1$ by Eq. (31) and the value $A_1$ held in the register $T_6$ in FIG. 9 differ in that they have been rotated one byte relative to each other. In either case, however, the register $T_6$ holds four pieces of data $a_0$, $a_3$, $a_9$ and $a_{10}$—this guarantees that the registers $T_6$ and $T_7$ hold the value of the set [R] just enough. The same is true of the relationship between the value $A_3$ by Eq. (31) and the value $A_3$ held in the register $T_4$ in FIG. 9.

In the cipher E2, since the basic encryption processing part performs byte-by-byte processing, the arrangement of, for example, the right-hand data need not always conform to the specification. That is, the implementation part of the encryption part needs only to correspond to the rearranged byte sequence.

Further, in this embodiment, the sets of bytes after permutation are divided to right and left in a correct order though different from the specified one. With the recent MPUs, it is possible to achieve particularly fast implementation of the BP function part in the cipher E2 for the data permutation and division used in cryptographic technology even when instructions for concatenating two registers into a virtually single register, shifting its data and storing high- or low-order data in the register are implemented on the MPUs. Such data permutation-division by the BP function in the cipher E2 is implemented using a data permutation-division: program, which is offered as being recorded on a recording medium. This facilitates the distribution of the program.

Embodiment 2

A second embodiment of the present invention is intended to efficiently perform an inverse calculation over an integral residue class ring, for example, in the division part 32 of the final transformation part 30 in FIG. 1. In step 3-2 of the afore-mentioned Zassenhaus algorithm, this embodiment immerses a in y not intact but by addition. This utilizes the property of the Zassenhaus algorithm that correct results could be obtained by reversing the sign even without masking in step 3-1.

That is, this embodiment calculates an inverse element $y = x^{-1} \mod 2^m$ of the input x. Let a and b be temporary variables, $m = 2^n$ ($n \geq 1$) and m be bit lengths of x, y, a and b. According to this embodiment, x is input and stored in storage means, followed by an initial process which: reads out x; calculates [x/2]; stores the calculated result as b in the storage means; stores the least significant bit as a in the storage means; reads out a, x and b; calculates [(ax+b)/2]; updates b with the calculated result; reads out x; and stores low-order two bits of x as y in the storage means.

Next, b and y area read out for i=1, 2, ..., n−1; −by is calculated; a in the storage means is updated with −by; b, a and x are read out of the storage means and are used to calculate [(b+ax)/(2^(2^i))]; b in the storage means is updated with the calculated value; y and a are read out of the storage means; and are used to calculate y+a×2^(2^i); and y in the storage means is updated with the calculated value. Note that p^q denotes the q-th power of p.

Next, y is read out of the storage means and output as the result of the inverse calculation.

Figure 11:
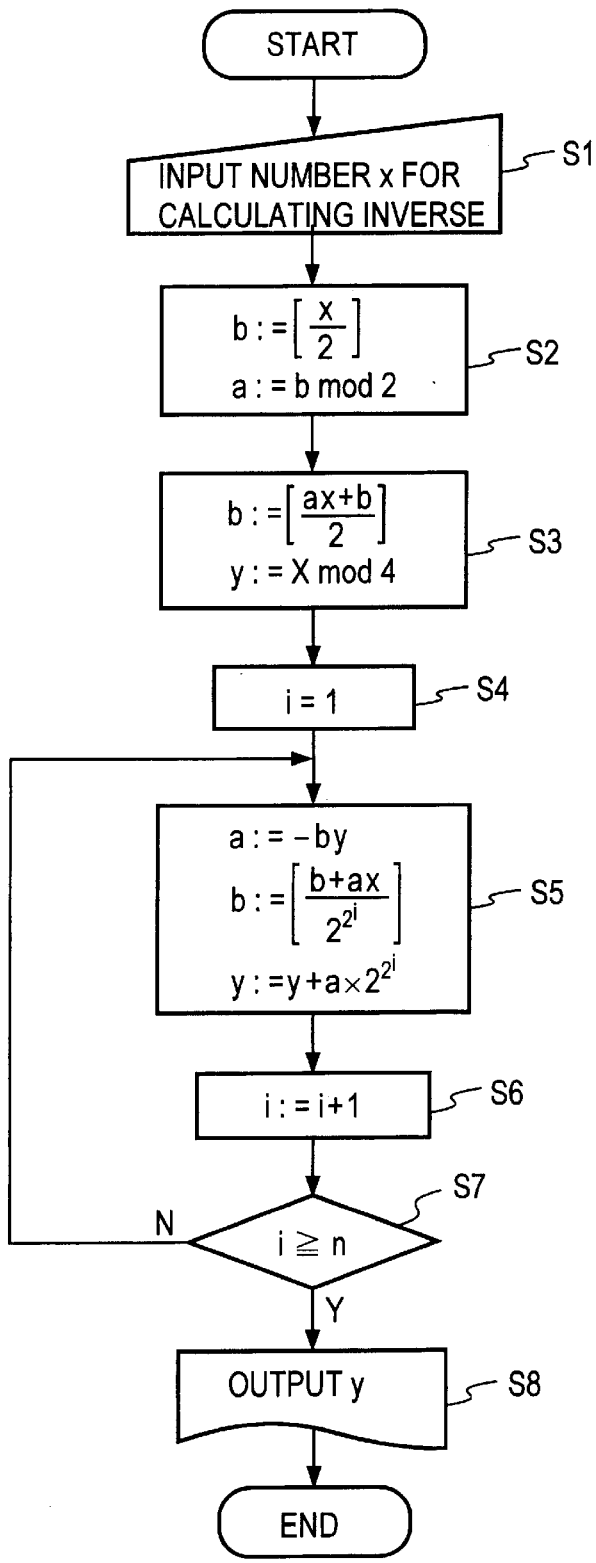
FIG. 11 is a flowchart showing the procedure of an inverse calculation by the present invention.

FIG. 11 depicts the procedure of the inverse calculation described above.

Let a and b be temporary or auxiliary variables, [x] be a Gauss' symbol (the maximum integer not exceeding x) and m=2^n (n≧1). The inverse calculation is performed as described below. In this case, x, y, a and b have a bit length of m.

Step 1: Input x.
Step 2: Perform the following calculations as initial processing.
  2-1. b:=[x/2]
  2-2. a:=the least significant bit of b (S2 in FIG. 11)
  2-3. b:=[(ax+b)/2]
  2-4. y:=low-order two bits of x (S3 in FIG. 11)
  2-5. i:=1(S4 in FIG. 11)
Step 3: Perform the following calculations for i=1, 2, ..., n−1
  3-1. a:=−by
  3-2. b:=[(b+ax)/(2^(2^i))]
  3-3. y:=y+a×2^(2^i) (S5 in FIG. 11)
  3-4. i:=i+1(S6 in FIG. 11)
Step 4: Output y.

In Step 2, substeps 2-1, 2-2 and 2-3 are performed in this order. Substeps 2-4 and 2-5 may be performed at arbitrary timing in Step 2.

Step 3 may be performed in the order 3-1→3-2→3-3 or 3-1→3-3→3-2, but on recent computers it is preferable from their data dependency to perform step 3 in the order 3-1→3-2→3-3. When i=n−1, b is not necessary, and hence substep 3-2 need not be carried out.

The loop of the algorithm may be described in a developed from of its interations in advance. (The number of iterations of the loop comes into play only on the order of the logarithm of the bit count of the inverse element to be calculated.) With the loop described in advance, it is possible to make the inverse calculation faster by precalculating i-dependent constants.

On ordinary processors divisions and multiplications by $2^n$ can be made faster by shift operations.

Figure 12:
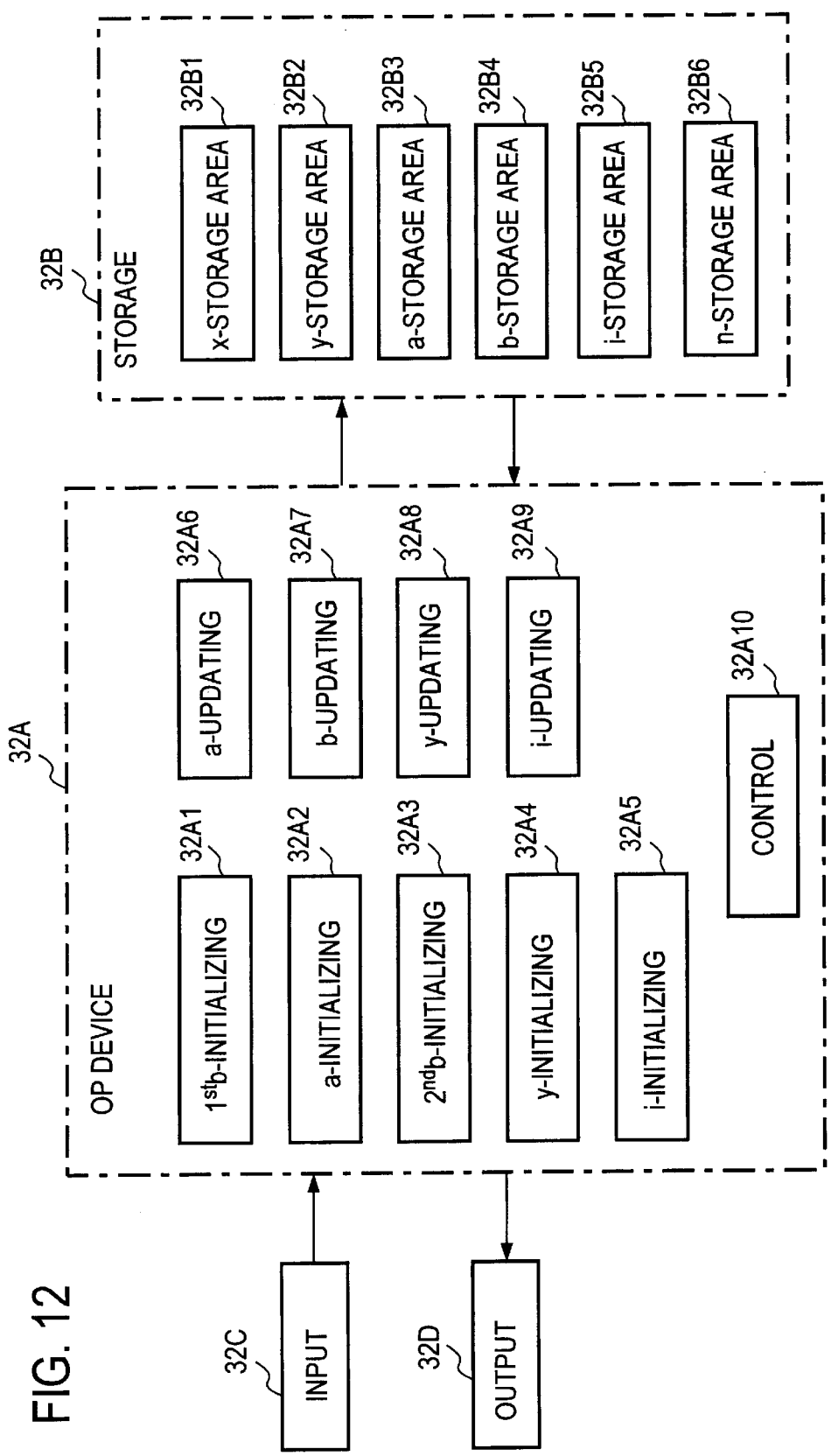
FIG. 12 is a block diagram depicting an example of the configuration of an apparatus for the inverse calculation of FIG. 11.

The validity of the above inverse calculation algorithm is described in the Appendix to this specification FIG. 12 illustrates the functional configuration of the inverse calculating apparatus according to this embodiment.

The input data x is stored by an input part 32C in an x-storage area of a storage device 32B. The stored data x is read out of the storage device 32B by first b-initializing means 32A1 in an operation device 32A, wherein it is used to calculate [x/2], which is stored as b in a b-storage area 32B4 of the storage device 32B.

The stored data b is read out by an a-initializing means 32A2 from the storage device 32B, and the least significant bit of the read-out data b is stored in a-storage area 32B3. By second b-initializing means 32A3 a, x and b are read out of the storage device 32B, then [(ax+b)/2] is calculated, and the calculated value is used as b to update the stored content of a b-storage area 32B4.

By y-initializing means 32A4 the stored data x in the storage device 32B is read out therefrom, and its low-order two bits are stored as y in a y-storage area 32B2 of the storage device 32B. By i-initializing means 32A51 is set as i in an i-storage area 32B5 of the storage device 32B.

By a-updating means 32A6 stored data b and y in the storage device 32B are read out therefrom, and −by is calculated, with which the stored data a in the a-storage area 32B3 is updated. By b-updating means 32A7 the stored data a, b, x and i in the storage device 32B are read out therefrom, and [(b+ax)/2^(2^i)] is calculated, with which the stored data in the b-storage area 32B4 is updated.

By y-updating means 32A8 the stored data a, y and i in the storage device 32B are read out therefrom, and y+a×2^(2^i) is calculated, with which the stored data y in the y-storage area 32B2 is updated. By i-updating means 32A9 the stored data i in the storage device 32B is read out therefrom, and i+1 is calculated, with which the stored data i in the i-storage area 32B5 is updated.

By control means 32A10 the stored data i and n are read out of the i-storage area 32B5 and an n-storage area 32B6 of the storage device 32B, then the a-updating means 32A6, the b-updating means 32A7, the y-updating means 32A8 and the i-updating means 32A9 are sequentially actuated until, i=n, and when i becomes equal to n, the stored data y in the storage device 32B is read out therefrom by an output part 32D and output therethrough.

The apparatus of the present invention is capable of performing its respective functions by a computer under program control.

As will be seen from substeps 3-1, 3-2 and 3-3 of Step 3, this embodiment does not involve the bit padding operation, and hence it reduces the workload of bit processing that has been an obstacle to the software implementation of the Zassenhaus algorithm. Thus this embodiment permits faster inverse calculation in mod $2^m$.

The "Zassenhaus method" and the inverse calculating method of the present invention were implemented on a general purpose workstation by C language and compared in terms of processing speed for n=5 (i.e. 32 bits). The input x was determined generating a random number and the operation was repeated for all x's; the two methods were compared, with OS overhead removed. The comparison showed that the inverse calculating method of the present invention was more than 10% faster than the "Zassenhaus method."

While Embodiment 2 has been described as being applied to the inverse calculation in the division part 32 of the cipher E2 shown in FIG. 1, it is also applicable, for example, to the inverse calculation in mod $2^m$ by the Montgomery algorithm that is used in the modular exponentiation operation over Z/NZ Embodiment 3

Figure 2:
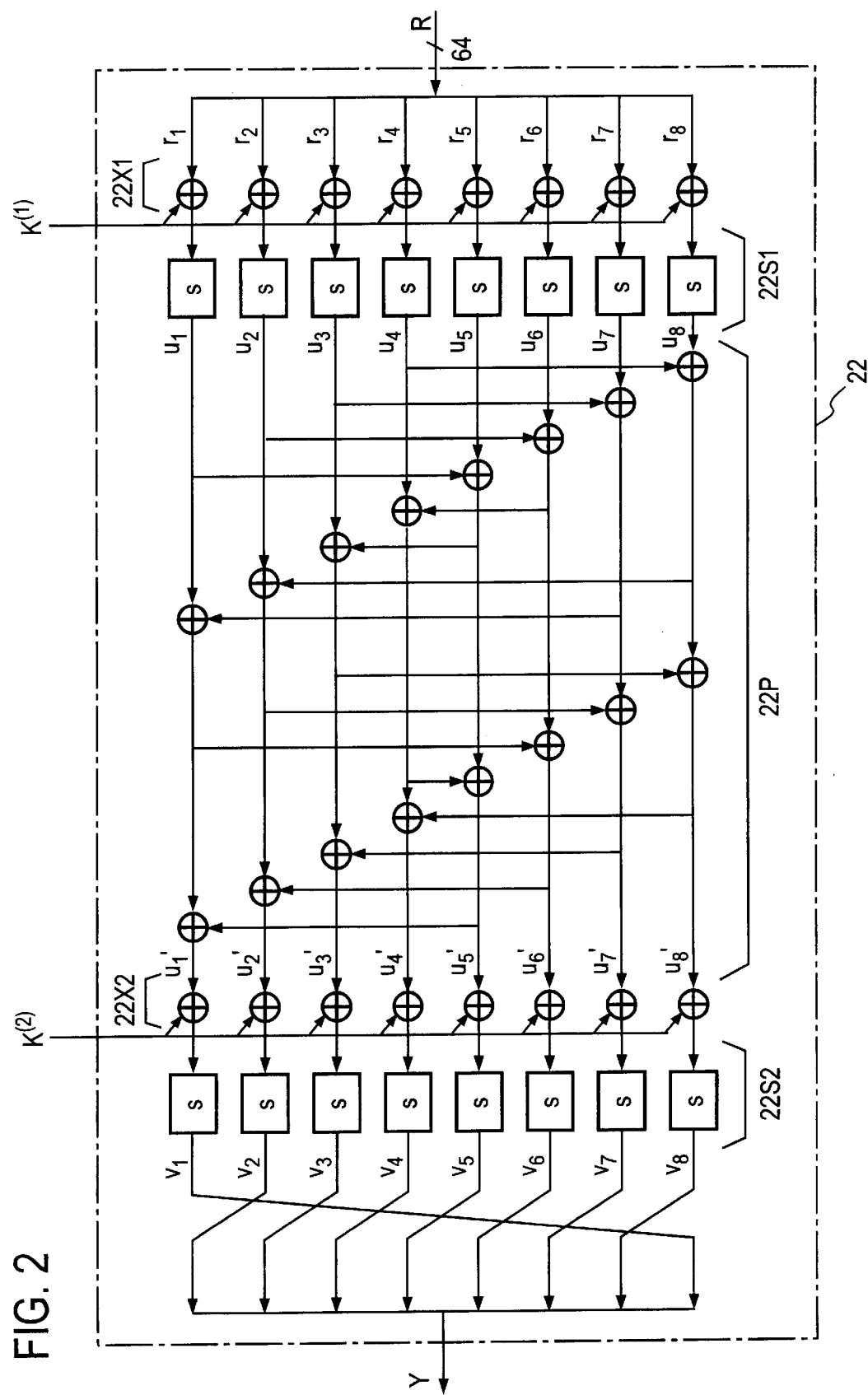
FIG. 2 is a block diagram depicting the configuration of a round function part 22 of each round processing stage in FIG. 1.

This embodiment is intended to reduce the numbers of memory references and additions involved and the storage capacity required in the substitution-permutation processing by the round function part 22 in the cipher E2 depicted in FIG. 2. In practice, the substitution and permutation of the type indicated by Eq. (17) are not usual and have such properties as listed below in many cases.

(1) Some of pieces of data $p_{ij}$ or $s_j$ are equal.

(2) Even if columns of the input or output are swapped or exchanged, the swap can be accommodated at a different part without decreasing the processing speed, and hence it can be transformed equivalently in terms of algorithm.

(3) The element of $R^n$ is stored in a register for storing a word that is the calculation unit on a computer, and can be calculated for each element.

Since the property (3) is implemented on recent processors as typified by an MMX instruction implemented on Intel processors, and since R is widely used which permits the element-by-element calculation of $R^n$ by and AND operation feasible on almost all processors, the property is considered to be a practical assumption.

This embodiment reduces the number of memory references and the storage capacity through utilization of the above-mentioned properties.

That is, according to this embodiment, when some of pieces of data $p_{ij}$ or $s_j$ are equal to one another in the afore-mentioned equations (17) and (18) expressing the substitution and permutation on the ring R $$\begin{bmatrix} y_1 \\ y_2 \\ \vdots \\ y_m \end{bmatrix} = P \begin{bmatrix} s_1(x_1) \\ s_2(x_2) \\ \vdots \\ s_n(x_n) \end{bmatrix} \quad (17)$$

where $$P = \begin{bmatrix} p_{11} & p_{12} & \cdots & p_{1n} \\ p_{21} & p_{22} & \cdots & p_{2n} \\ \vdots & \vdots & \ddots & \vdots \\ p_{m1} & p_{m2} & \cdots & p_{mn} \end{bmatrix} \quad (18)$$

$$p_{ij} \in R, \quad s_j: R \rightarrow R \quad i = 1, 2, \cdots, m \quad j = 1, 2, \cdots, n$$

rows of the matrix P expressing the permutation are rearranged, then vector $v_1 \in R^r$ (The dimension r is up to m and the vectors may differ in dimension.) on the ring R and the function $S_k R \rightarrow R^r$ (where k=1, 2, ... n, r≤m), which are necessary for the substitution and permutation, are precalcuated for each $x_i$, and the precalculated values are stored in storage means. For the input $x_i$: $S_k$ is read out of the storage means, and a vector $S_k(x_i)$ is calculated; a set of vectors $\{v_i\}$ necessary for forming a k-th column of the matrix P is read out of the storage means and a vector $u_k$ is generated; then $u_k S_k(x_i)$ (where * is the product for each vector element) is calculated, and these values are added together to obtain a data sequence $y_i$.

This embodiment will be described below concretely. In practice, the actual substitution and permutation mostly use a field as the ring R, and hence R will be limited specifically to a unitary ring (including the unit element of multiplication). In the interests of simplicity, this embodiment will be described in connection with the case where the calculation of Eq. (17) is $P_{ij} \in \{0, 1\}$ and the pieces of data $s_j$ are identical. When the data $s_j$ have several kinds of pieces and some of them are equal, or when the data $p_{ij}$ have pieces taking other values than 0 and 1 and some of them are equal, the operation is less efficient than the examples described below but more efficient than in the case of the conventional method set forth in Literature S.

Embodiment 3-1

Consider the case of calculating Eq. (17). When all pieces of data $s_j$ are the same s, setting $$v_j = \begin{bmatrix} p_{1j} \\ p_{2j} \\ \vdots \\ p_{mj} \end{bmatrix} \quad j = 1, 2, \cdots, n \quad (32)$$

$$S: R \rightarrow R^m; \quad S(x) = \begin{bmatrix} s(x) \\ s(x) \\ \vdots \\ s(x) \end{bmatrix} \quad (33)$$

enables Eq. (20) to be written as follows:

$$SP: R \rightarrow R^m; \quad SP_j(x) = \begin{bmatrix} p_{1j}s(x_j) \\ p_{2j}s(x_j) \\ \vdots \\ p_{mj}s(x_j) \end{bmatrix} = v_j * S(x_j), \quad (34)$$

$$j = 1, 2, \ldots, n$$

where * is the product for each element of the vector.

From the above it will be understood that, by precalculating S and prestoring the calculated value in a memory, Eq. (17) can be calculated with n memory references for $x_l$ to $x_n$, n multiplications to obtain the product * for each vector element and n−1 additions of n column vectors. The prior art stores $SP_l$ to $SP_n$, but this embodiment stores only S and hence reduces the amount of data stored down to 1/n.

Embodiment 3-2

Consider the case of calculating Eq. (17) in an environment where the calculation unit is smaller than $R^{[(m+1)/2]}$ (where $[(m+1)/2]$ is the maximum integer not exceeding (m+1)/2). The following example is applicable to ordinary matrices P. To facilitate a better understanding of the invention, consider the application of the invention to the case of the following matrix (Eq. 35) used in the cipher E2, that is, to the substitution and permutation (Eq. 36).

$$P = \begin{bmatrix} 0 & 1 & 1 & 1 & 1 & 1 & 1 & 0 \\ 1 & 0 & 1 & 1 & 0 & 1 & 1 & 1 \\ 1 & 1 & 0 & 1 & 1 & 0 & 1 & 1 \\ 1 & 1 & 1 & 0 & 1 & 1 & 0 & 1 \\ 1 & 1 & 0 & 1 & 1 & 1 & 0 & 0 \\ 1 & 1 & 1 & 0 & 0 & 1 & 1 & 0 \\ 0 & 1 & 1 & 1 & 0 & 0 & 1 & 1 \\ 1 & 0 & 1 & 1 & 1 & 0 & 0 & 1 \end{bmatrix} \quad (35)$$

$$\begin{bmatrix} y_0 \\ y_1 \\ y_2 \\ y_3 \\ y_4 \\ y_5 \\ y_6 \\ y_7 \end{bmatrix} = \begin{bmatrix} 0 & 1 & 1 & 1 & 1 & 1 & 1 & 0 \\ 1 & 0 & 1 & 1 & 0 & 1 & 1 & 1 \\ 1 & 1 & 0 & 1 & 1 & 0 & 1 & 1 \\ 1 & 1 & 1 & 0 & 1 & 1 & 0 & 1 \\ \hline 1 & 1 & 0 & 1 & 1 & 1 & 0 & 0 \\ 1 & 1 & 1 & 0 & 0 & 1 & 1 & 0 \\ 0 & 1 & 1 & 1 & 0 & 0 & 1 & 1 \\ 1 & 0 & 1 & 1 & 1 & 0 & 0 & 1 \end{bmatrix} \begin{bmatrix} s(x_0) \\ s(x_1) \\ s(x_2) \\ s(x_3) \\ s(x_4) \\ s(x_5) \\ s(x_6) \\ s(x_7) \end{bmatrix} \quad (36)$$

The horizontal line in the matrix of Eq. (36) is intended only to make it easy to see. It should be noted that a substitution with no permutation is also needed at end of the operation in the cipher E2.

To implement the substitution and permutation using the matrix P by the method proposed in Literature S, 4-element column vectors forming the upper half submatrix of P are four kinds vectors each containing a 0, the left-hand four column vectors forming the lower half matrix are also four kinds of vectors each containing a 0, and the right-hand column vectors of the lower: half matrix are four kinds of vectors each containing two 0s. Accordingly, to perform $$\begin{bmatrix} 0 \\ s(x) \\ s(x) \\ s(x) \end{bmatrix}, \begin{bmatrix} s(x) \\ 0 \\ s(x) \\ s(x) \end{bmatrix}, \begin{bmatrix} s(x) \\ s(x) \\ 0 \\ s(x) \end{bmatrix}, \begin{bmatrix} s(x) \\ s(x) \\ s(x) \\ 0 \end{bmatrix}, \begin{bmatrix} 0 \\ 0 \\ 0 \\ s(x) \end{bmatrix}, \begin{bmatrix} s(x) \\ 0 \\ 0 \\ s(x) \end{bmatrix}, \begin{bmatrix} s(x) \\ s(x) \\ 0 \\ 0 \end{bmatrix}, \begin{bmatrix} 0 \\ s(x) \\ s(x) \\ 0 \end{bmatrix}$$

and only permutation, the following tables are required.

$$\begin{bmatrix} s(x) \\ 0 \\ 0 \\ 0 \end{bmatrix}, \begin{bmatrix} 0 \\ s(x) \\ 0 \\ 0 \end{bmatrix}, \begin{bmatrix} 0 \\ 0 \\ s(x) \\ 0 \end{bmatrix}, \begin{bmatrix} 0 \\ 0 \\ 0 \\ s(x) \end{bmatrix}$$

In this instance, letting the memory capacity necessary for storing #R (where # represents the number of elements of a set) elements of $R^4$ be one unit (which definition will hereinafter be applied), the computation cost is as follows:

Required memory capacity: 12

Number of table references: 16

Number of additions: 14

In this embodiment, the order of calculation of Eq. (36) is changed by swapping columns of the matrix P to:

$$\begin{bmatrix} y_0 \\ y_7 \\ y_4 \\ y_3 \\ y_6 \\ y_1 \\ y_2 \\ y_5 \end{bmatrix} = \begin{bmatrix} 0 & 1 & 1 & 1 & 1 & 1 & 1 & 0 \\ 1 & 0 & 1 & 1 & 1 & 0 & 0 & 1 \\ 1 & 1 & 0 & 1 & 1 & 1 & 0 & 0 \\ 1 & 1 & 1 & 0 & 1 & 1 & 0 & 1 \\ 0 & 1 & 1 & 1 & 0 & 0 & 1 & 1 \\ 1 & 0 & 1 & 1 & 0 & 1 & 1 & 1 \\ 1 & 1 & 0 & 1 & 1 & 0 & 1 & 1 \\ 1 & 1 & 1 & 0 & 0 & 1 & 1 & 0 \end{bmatrix} \begin{bmatrix} s(x_0) \\ s(x_1) \\ s(x_2) \\ s(x_3) \\ s(x_4) \\ s(x_5) \\ s(x_6) \\ s(x_7) \end{bmatrix} \quad (37)$$

The vertical and horizontal lines in the above matrix are intended to facilitate a better understanding of the description given below, and they have no particular meanings. As a result, the required table is formed by: four kinds of 4-element column vectors each containing a 0; one kind of 4-element column vector containing two 0s; one kind of 4-element column vector containing only 1s; and two kinds of 4-element column vector each containing only one 1. The column vectors containing one 1 are used for substitution as well as for permutation. Hence, only the following tables need to be stored:

$$\begin{bmatrix} 0 \\ s(x) \\ s(x) \\ s(x) \end{bmatrix}, \begin{bmatrix} s(x) \\ 0 \\ s(x) \\ s(x) \end{bmatrix}, \begin{bmatrix} s(x) \\ s(x) \\ 0 \\ s(x) \end{bmatrix}, \begin{bmatrix} s(x) \\ s(x) \\ s(x) \\ 0 \end{bmatrix}, \begin{bmatrix} 0 \\ s(x) \\ 0 \\ s(x) \end{bmatrix},$$

-continued $$\begin{bmatrix} s(x) \\ s(x) \\ s(x) \\ s(x) \end{bmatrix}, \begin{bmatrix} s(x) \\ 0 \\ 0 \\ 0 \end{bmatrix}, \begin{bmatrix} 0 \\ s(x) \\ 0 \\ 0 \end{bmatrix}, \begin{bmatrix} 0 \\ 0 \\ s(x) \\ 0 \end{bmatrix}, \begin{bmatrix} 0 \\ 0 \\ 0 \\ s(x) \end{bmatrix}$$

And the memory reference and addition for $x_0$, $x_1$, $x_2$ and $x_3$ can be made common thereto. Accordingly, the computation cost in this case is as follows:

Required memory capacity: 10

Number of table references: 12

Number of additions: 11

As compared with the method described in Literature S, the method of this embodiment permits reduction of all of the memory capacity, the number of table references and the number of additions. It must be noted here that, the arrangement of $y_i$ ($0 \leq i \leq 7$) on the left-hand side of Eq. (37) does not impair performance.

Embodiment 3—3

Consider the case of calculating Eq. (17) in an environment where the calculation unit is smaller than $R^{\lceil (m+1)/2 \rceil}$ as is the case with Embodiment 3-2 and the following shift operation can be performed fast.

$$\begin{bmatrix} x_0 \\ x_1 \\ x_2 \\ x_3 \\ \vdots \\ \vdots \\ x_n \end{bmatrix} \rightarrow \begin{bmatrix} 0 \\ 0 \\ x_0 \\ x_1 \\ \vdots \\ \vdots \\ x_{n-2} \end{bmatrix} \quad \text{(Example of shift of low-order two elements)} \quad (38)$$

As is the case with Embodiment 3-2, this embodiment is also applicable to ordinary matrices P, but for simplicity sake, this example will be described as being applied to the matrix P (see Eq. 35)) and substitution-permutation (see Eq. (36)) used in the cipher E2.

As is the case with Embodiment 3-2, the order of calculation is changed by swapping rows of the matrix P as follows:

$$\begin{bmatrix} y_0 \\ y_1 \\ y_3 \\ y_2 \\ y_6 \\ y_7 \\ y_5 \\ y_4 \end{bmatrix} = \begin{bmatrix} 0 & 1 & 1 & 1 & 1 & 1 & 1 & 0 \\ 1 & 0 & 1 & 1 & 0 & 1 & 1 & 1 \\ 1 & 1 & 1 & 0 & 1 & 1 & 0 & 1 \\ 1 & 1 & 0 & 1 & 1 & 0 & 1 & 1 \\ 0 & 1 & 1 & 1 & 0 & 0 & 1 & 1 \\ 1 & 0 & 1 & 1 & 1 & 0 & 0 & 1 \\ 1 & 1 & 1 & 0 & 0 & 1 & 1 & 0 \\ 1 & 1 & 0 & 1 & 1 & 1 & 0 & 0 \end{bmatrix} \begin{bmatrix} s(x_0) \\ s(x_1) \\ s(x_2) \\ s(x_3) \\ s(x_4) \\ s(x_5) \\ s(x_6) \\ s(x_7) \end{bmatrix} \quad (39)$$

In the processing for $x_4$, $x_5$, $x_6$, $x_7$: as regards $y_0$, $y_1$, $y_3$, $y_2$, memory-stored reference tables are used intact; and as for $y_6$, $y_7$, $y_5$ and $y_4$, values read out of the memory-stored reference tables for $y_0$, $y_1$, $y_3$ and $y_2$ are shifted down one element, down two elements, up one element and up two elements, respectively. That is, the leftmost column vector of the upper right submatrix of the matrix P is shifted down one element to obtain the leftmost column vector of the lower right submatrix, then the column vector second from the left-hand side of the upper right submatrix is shifted down two elements to obtain the column vector second from the left-hand side of the lower right submatrix, and thereafter the column vectors third and fourth from the left-hand side of the upper right submatrix are shifted up one element and two elements, respectively, to obtain the column vectors third and fourth from the left-hand side of the lower right submatrix.

Accordingly, all the tables that need to be stored are only such as follows:

$$SP_0(x) = \begin{bmatrix} 0 \\ s(x) \\ s(x) \\ s(x) \end{bmatrix}, \quad SP_1(x) = \begin{bmatrix} s(x) \\ 0 \\ s(x) \\ s(x) \end{bmatrix},$$

$$SP_2(x) = \begin{bmatrix} s(x) \\ s(x) \\ 0 \\ s(x) \end{bmatrix}, \quad SP_3(x) = \begin{bmatrix} s(x) \\ s(x) \\ s(x) \\ 0 \end{bmatrix}$$

$$\begin{bmatrix} s(x) \\ 0 \\ 0 \\ 0 \end{bmatrix}, \begin{bmatrix} 0 \\ s(x) \\ 0 \\ 0 \end{bmatrix}, \begin{bmatrix} 0 \\ 0 \\ s(x) \\ 0 \end{bmatrix}, \begin{bmatrix} 0 \\ 0 \\ 0 \\ s(x) \end{bmatrix}$$

Letting the k-element up-shift operation and the k-element down-shift operation be represented by $SU_k$ and $SD_k$, respectively, and setting $$T \leftarrow SP_0(x_0)+SP_1(x_1)+SP_3(x_2)+SP_2(x_3)$$

$$U_0 \leftarrow SP_1(x_4)$$

$$U_1 \leftarrow SP_3(x_5)$$

$$U_2 \leftarrow SP_2(x_6)$$

$$U_3 \leftarrow SP_0(x_7) \qquad (40)$$

the following calculations can be conducted:

$$\begin{bmatrix} y_0 \\ y_1 \\ y_3 \\ y_2 \end{bmatrix} \leftarrow T + U_0 + U_1 + U_2 + U_3 \qquad (41)$$

$$\begin{bmatrix} y_6 \\ y_7 \\ y_5 \\ y_4 \end{bmatrix} \leftarrow T + SD_1(U_0) + SD_2(U_1) + SU_1(U_2) + SU_2(U_3) \qquad (42)$$

Accordingly, this embodiment also reduces the computation cost as compared with the method of Literature S in terms of the memory capacity, the number of memory references and the number of additions as follows:

Required memory capacity: 8

Number of table references: 8

Number of additions: 11

Number of shifts: 4

In this embodiment, too, it should be noted that the arrangement of $y_i$ ($0 \leq i \leq 7$) on the left-hand side does not incur performance degradation.

Embodiment 3-4

This embodiment is also applicable to ordinary matrices P in some cases, but for the sake of simplicity, the embodiment will be described in connection with the case where the matrix P (see Eq. (35)) and substitution and permutation (see Eq. (36)) used in the cipher E2 are defined for a ring R of a characteristic 2.

As is the case with Embodiment 3-3, respective rows of the matrix P are swapped to obtain $$\begin{bmatrix} y_0 \\ y_1 \\ y_2 \\ y_3 \\ y_6 \\ y_7 \\ y_4 \\ y_5 \end{bmatrix} = \begin{bmatrix} 0 & 1 & 1 & 1 & | & 1 & 1 & 1 & 0 \\ 1 & 0 & 1 & 1 & | & 0 & 1 & 1 & 1 \\ 1 & 1 & 0 & 1 & | & 1 & 0 & 1 & 1 \\ 1 & 1 & 1 & 0 & | & 1 & 1 & 0 & 1 \\ \hline 0 & 1 & 1 & 1 & | & 0 & 0 & 1 & 1 \\ 1 & 0 & 1 & 1 & | & 1 & 0 & 0 & 1 \\ 1 & 1 & 0 & 1 & | & 1 & 1 & 0 & 0 \\ 1 & 1 & 1 & 0 & | & 0 & 1 & 1 & 0 \end{bmatrix} \begin{bmatrix} s(x_0) \\ s(x_1) \\ s(x_2) \\ s(x_3) \\ s(x_4) \\ s(x_5) \\ s(x_6) \\ s(x_7) \end{bmatrix} \qquad (43)$$

Note the upper right and lower right submatrices of the above matrix.

$$Q_U = \begin{bmatrix} 1 & 1 & 1 & 0 \\ 0 & 1 & 1 & 1 \\ 1 & 0 & 1 & 1 \\ 1 & 1 & 0 & 1 \end{bmatrix}, \quad Q_D = \begin{bmatrix} 0 & 0 & 1 & 1 \\ 1 & 0 & 0 & 1 \\ 1 & 1 & 0 & 0 \\ 0 & 1 & 1 & 0 \end{bmatrix} \qquad (44)$$

In this instance, the following equation holds:

$$Q_U - Q_D = \begin{bmatrix} 1 & 1 & 0 & 1 \\ 1 & 1 & 1 & 0 \\ 0 & 1 & 1 & 1 \\ 1 & 0 & 1 & 1 \end{bmatrix} = SD_1(Q_U) + SU_3(Q_U) \qquad (45)$$

It must be noted here that a ring of a character 2 is considered as R.

If the following table is prepared in advance as in the case of Embodiment 3—, $$SP_0(x) = \begin{bmatrix} 0 \\ s(x) \\ s(x) \\ s(x) \end{bmatrix}, \quad SP_1(x) = \begin{bmatrix} s(x) \\ 0 \\ s(x) \\ s(x) \end{bmatrix},$$

$$SP_2(x) = \begin{bmatrix} s(x) \\ s(x) \\ 0 \\ s(x) \end{bmatrix}, \quad SP_3(x) = \begin{bmatrix} s(x) \\ s(x) \\ s(x) \\ 0 \end{bmatrix}$$

the following calculation can be performed by Eq. (45):

$$T \leftarrow SP_0(x_0)+SP_1(x_1)+SP\ hd\ 2(x_2)+SP_3(x_3)$$

$$U \leftarrow SP_1(x_4)+SP_2(x_5)+SP\ hd\ 3(x_6)+SP_0(x_7)$$

$$\begin{bmatrix} y_0 \\ y_1 \\ y_2 \\ y_3 \end{bmatrix} \leftarrow T + U \qquad (46)$$

$$\begin{bmatrix} y_6 \\ y_7 \\ y_4 \\ y_5 \end{bmatrix} \leftarrow \begin{bmatrix} y_0 \\ y_1 \\ y_2 \\ y_3 \end{bmatrix} - SD_1(U) - SD_3(U)$$

In this case, the computation cost is as follows:
   Number of table references (for calculation of $SP_j$): 8
   Number of additions/subtractions (for calculation of +): 9
   Number of shifts (for calculations of SU and SD): 2

Thus, this embodiment permits further reduction of the number of additions/subtractions and the number of shifts than does embodiment 3—3.

Embodiment 3-5

Some processors allow not only the use of the shift operations SU and SD but also the use of the following downward k-element rotation for n elements:

$$RD_k(x) = SD_k(x) + SU_{n-k}(x)$$

In this instance, by using the downward shift for the calculation of Eq. (46) in Embodiment 3-4, the following equation can be conducted.

$$\begin{bmatrix} y_6 \\ y_7 \\ y_4 \\ y_5 \end{bmatrix} \leftarrow \begin{bmatrix} y_0 \\ y_1 \\ y_2 \\ y_3 \end{bmatrix} - RD_1(U) \quad (47)$$

The computation cost in this case is as follows:
   Number of table references (for calculation of $SP_j$): 8
   Number of additions (for ± calculation): 8
   Number of rotations (for calculation of RD): 1

This embodiment permits further reduction of the number of additions as compare with that in the case of Embodiment 3-4.

Figure 13:
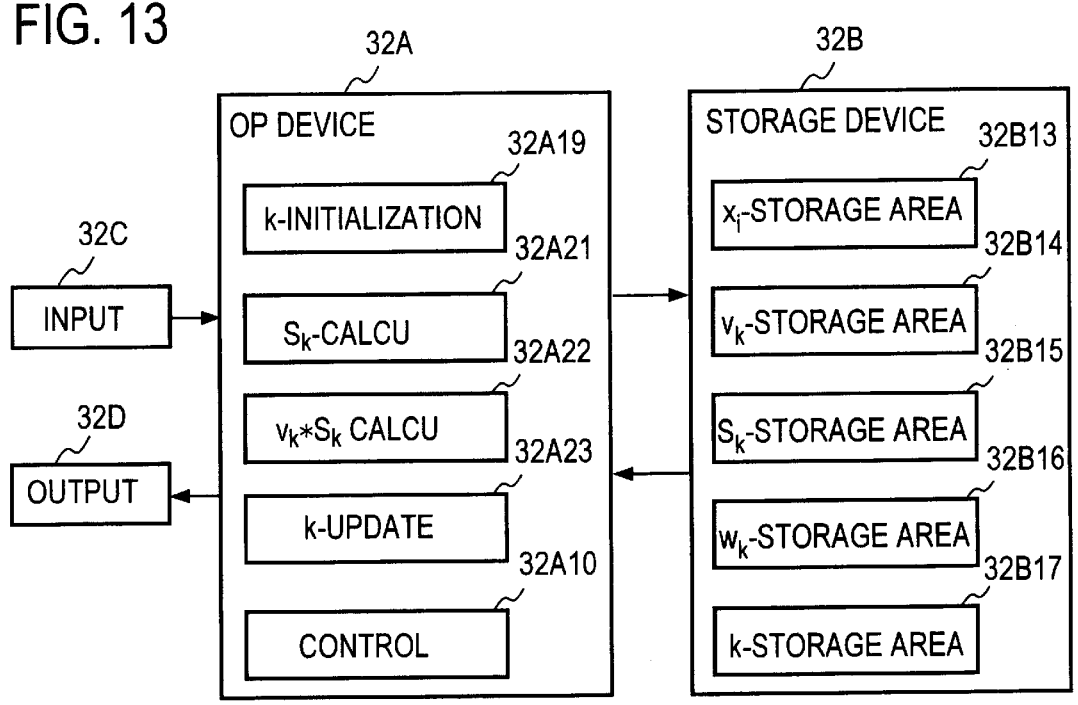
FIG. 13 is a block diagram depicting an example of the configuration of an apparatus for performing the substitution-permutation by this invention method in an S and P function parts in the round function part 22 of FIG. 2.

FIG. 13 depicts the functional configuration of Embodiment 3-1. The input data $x_i$ is stored by input means 32C in an $x_i$-storage area 32B13 of a storage device 32B; the permuted vector $v_k \in R^r$ is stored in a $v_k$-storage area 32B14; and the substitution function $S_k$ is stored in an $S_k$-storage area 32B15. Furthermore, the working vector $w_k$ is stored in a $w_k$-storage area 32B16, and the working parameter k is stored in a k-storage area 32B17. By k-initializing means 32A19 in the operation device 32A k is initialized to 0, and by $S_k$-calculating means 32A21 the $S_k$-storage area 32B15 is read out using the input data $x_i$, and the calculated value of the vector $S_k(x_i)$ is stored as $w_k$ in the $w_k$-storage area 32B16. From the storage means 32B $v_k$ and $w_k$ are read out, and their product for each element is calculated by $v_k * S_k$ calculating means 32A22, and the calculated value is used to update $w_k$. By k-updating means 32A23 k in the k-storage area 32B17 is updated by being incremented by 1. The $S_k$-calculating means 32A21, the $v_k * S_k$ calculating means 32A22 and the k-updating means 32A23 are actuated one after another until k=n; respective $w_k$ in the storage means 32B are read out therefrom, then their sum is calculated, and the calculated value is output via output means 32D.

Figure 14:
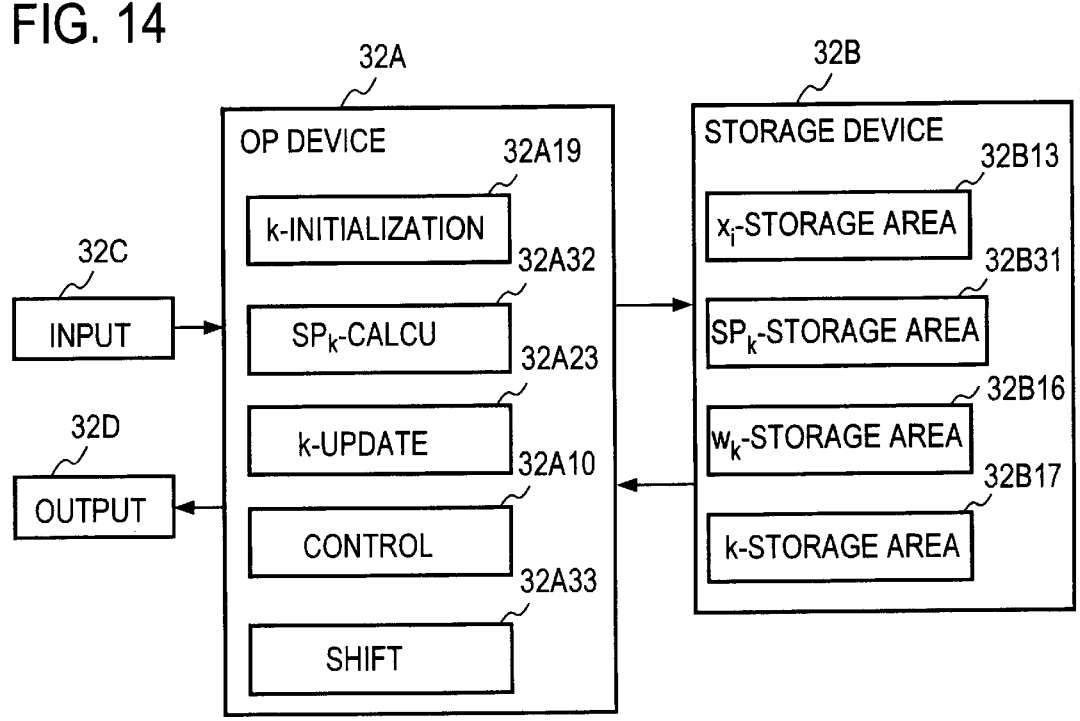
FIG. 14 is a block diagram depicting another example of the configuration of the apparatus for performing the substitution-permutation by this invention method in an S and P function parts in the round function part 22 of FIG. 2.

FIG. 14 there is depicted the functional configuration of Embodiment 3-2, in which the parts corresponding to those in FIG. 13 are denoted by the same reference numerals. The $v_k$-storage area 32B14 and the $S_k$-storage area 32B1 in FIG. 13 are substituted with $SP_k$-storage area 32B31, in which $SP_k$ is stored. By $SP_k$ calculating means 32A32 $SP_k(x_i)$ is calculated in accordance with the input data $x_i$, and the calculated value is stored as the vector $w_k$ in the $w_k$-storage area 32B16. Embodiment 3-2 is identical in construction with Embodiment 3-1 except the above.

In Embodiment 3—3, the read-out $SP_k(x_i)$ is shifted by shift means 32A33 in FIG. 14, and the shifted $SP_k(x_i)$ is stored as the vector wk in the $w_k$-storage area 32B16.

Embodiment 4

With the calculation scheme as defined by Eq. (10), upon each calculation of $u_i'$, the calculated value is discarded and the next $u_i'$ is calculated by newly conducting an addition and a subtraction. However, since the defining equation for calculating each $u_i$, contains two or more components common to those of the defining equation for calculating another $u_i'$, that is, since the both defining equations are similar to some extent, it is possible to utilize the previous calculated value by expressing the current value $u_i'$ as $u_i' = u_j' + D_i$ using its difference $D_i$ from the previous calculated value $u_j'$. This embodiment is intended to reduce the number of times the memory is read.

Embodiment 4-1

In this embodiment, the value $u_i'$ is expressed by $u'_{i+1} = u'_i + D_i$ and the permutation operation is performed by the following equation:

$$u_1' = u_2 + u_3 + u_4 + u_5 + u_6 + u_7$$

$$u_2' = u_1' + u_1 - u_2 - u_5 + u_8$$

$$u_3' = u_2' + u_2 - u_3 + u_5 - u_6$$

$$u_4' = u_3' + u_3 - u_4 + u_6 - u_7$$

$$u_5' = u_4' - u_3 + u_4 - u_8$$

$$u_6' = u_5' + u_3 - u_4 - u_5 + u_7$$

$$u_7' = u_6' - u_1 + u_4 - u_6 + u_8$$

$$u_8' = u_7' + u_1 - u_2 + u_5 - u_7 \quad (48)$$

The computation cost by this method is as follows:
   Number of additions/subtractions: 32
   Number of memory reads: 33
   Number of memory writes: 8

As compared with conventional Scheme 1 described previously, this embodiment permits a 25% reduction of the number of memory writes. Incidentally, it must also noted here that since the value $u_i'$ is held in an accumulator at the time of calculating $u'_{i+1}$, no memory access for write is needed.

While this embodiment has been described as being applied to permutation using the matrix P in the cipher E2 for the sake of simplicity, this embodiment is not limited specifically to the matrix P but it may be applied to every permutation that is expressed by the matrix composed of elements {0, 1}. General properties of such application are described below.

The conventional Scheme 1 calculates each value $u_i'$ (where i=1, 2, ..., 8) after reading in the required value $u_j$ (where j=1, 2, 3, ..., 8). On this account, the total number of memory reads is equal to the total number of "1" components in the matrix P. This means that the larger the total number of "1" components in the matrix P, the larger the number of memory reads and the lower the processing speed.

On the other hand, according to this embodiment, $u'_{i+1}$ can be calculated after reading in only $u_j$ (where j=1, 2, ..., 8) that is the difference between $u'_{i+1}$ and $u'_i$. In general, it is expected that the larger the total number of "1" components in the matrix P, the smaller the difference between $u'_{i+1}$ and $u'_i$. This means that an increase in the total number of "1" components in the matrix P decreases the number of memory reads, providing increased processing speed.

Unlike the conventional Scheme 2, this embodiment is free from limitations on the method of implementing the matrix P, and hence it is versatile. Incidentally, it is not obvious whether the method this embodiment is superior to the conventional Scheme 3 when the total number of "1" components in the matrix P is extremely large.

Embodiment 4-2

Embodiment 4-1 has been described to calculate $u'_i$ in a sequential order starting first for i=1, but the calculation need not always be conducted in such a sequential order because $u'_i$ (where i=1, 2, . . . , 8) are described in parallel in the actual implementation. Then the computational complexity, can be reduced by utilizing $u'_j$ that decrease its difference from $u_i'$. For example, the calculation of $u_7'$ from $u_6'$ requires reading-in of $u_1$, $u_4$, $u_6$ and $u_8$, but the calculation of $u_4'$ after $u_6'$ requires reading-in of only $u_5$, $u_7$ and $u_8$, and hence it permits reduction of the numbers of memory reads and additions/subtractions by one.

By determining the order of calculation of $u'_i$ such that the total number of all differences, i.e. the number of memory reads becomes minimum, it is possible to optimize the calculation. Shown below is one of the optimum orders of calculation in the P function part 22 (FIG. 2) in the cipher E2.

$$u_6' = u_1 + u_2 + u_3 + u_6 + u_7$$

$$u_4' = u_6' + u_5 - u_7 + u_8$$

$$u_5' = u_4' - u_3 + u_4 - u_8$$

$$u_3' = u_5' - u_6 + u_7 + u_8$$

$$u_8' = u_3' - u_2 + u_3 - u_7$$

$$u_2' = u_8' - u_5 + u_6 + u_7$$

$$u_7' = u_2' - u_1 + u_2 - u_6$$

$$u_1' = u_7' + u_5 + u_6 - u_8 \qquad (49)$$

The computational complexity for permutation by this method is as follows:

Number of additions/subtractions: 25

Number of memory reads: 26

Number of memory writes: 8

Accordingly, the number of memory reads is about 35% smaller than in the case of Scheme 1 and about 25% smaller than in Scheme 2.

While this embodiment has been described as being applied to permutation using the matrix P in the cipher E2 for the sake of simplicity, this embodiment is not limited specifically to the matrix P, and it is evident that the scheme of this embodiment may be applied to every permutation that is expressed by the matrix composed of elements {0, 1}. General properties of such application are described below.

The scheme of this embodiment is apparently improved from the scheme of Embodiment 4-1, and hence it is faster than the conventional Scheme 1 except an address calculation for the write of $u_i'$. Besides, unlike the conventional Scheme 2, this embodiment is free from limitations on the method of implementing the matrix P, and hence it is versatile.

On the other hand, when the total number of "1" component in the matrix P is large, it is expected to provide an order of calculation that decreases the difference between $u_i'$ and $u'_j$ as a whole, and in almost all cases it is implemented with the minimum number of memory reads. For example, in the case of Embodiment 4-2, there is such a method that $u_j'$ can be derived from $u_i'$ by three pieces of $u_k$ are read out of memories. In general, the number of memory reads necessary for obtaining $u_i'$ from σ by the conventional Scheme 3 may be considered to be equal to or larger than the minimum number of memory reads in Embodiment 4-2. It can be safely said, therefore, that this embodiment is smaller, in almost all cases, than Scheme 3 in the total number of memory reads necessary for obtaining all $u_i'$ (where i=1, 2,. . . , 8)

Figure 15:
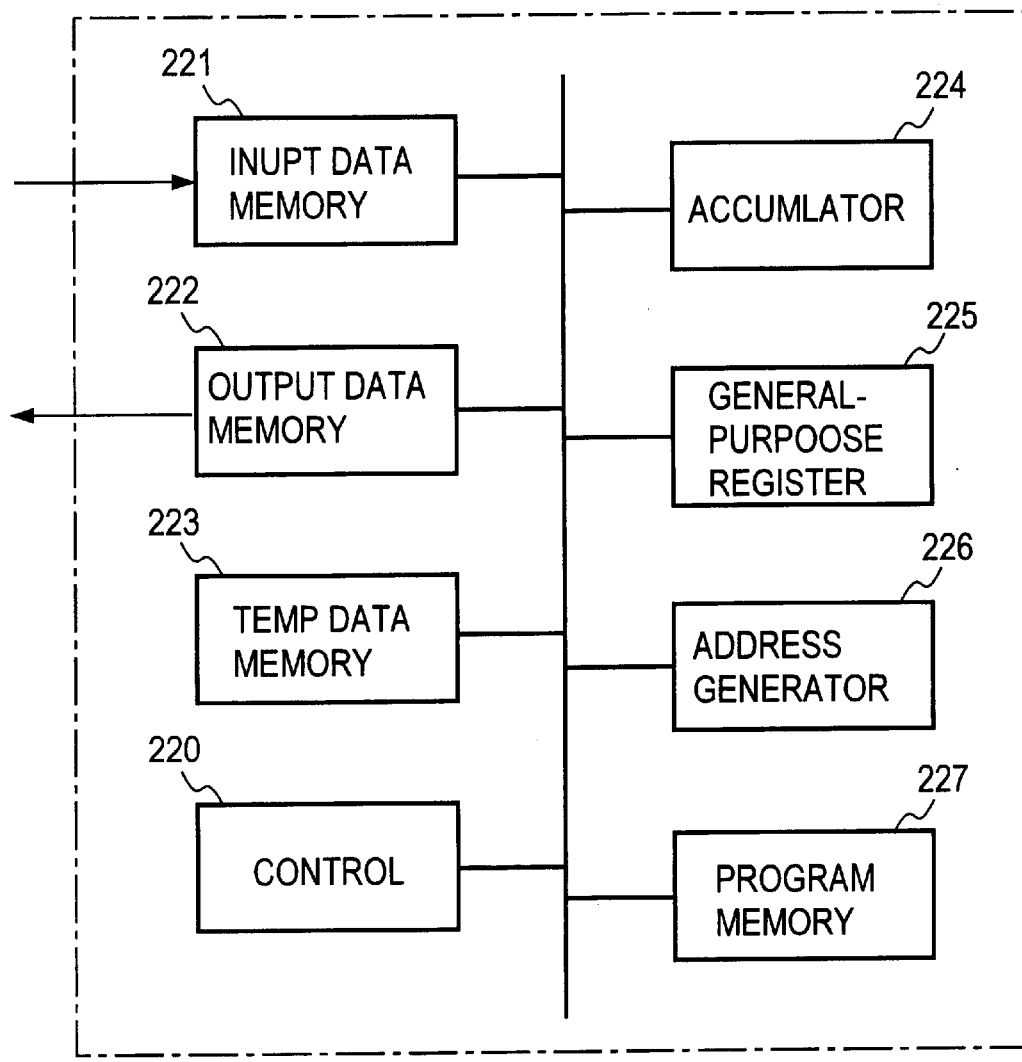
FIG. 15 is a block diagram illustrating an example of the configuration of an apparatus for performing the operation of a P function part 22P in FIG. 2.

FIG. 15 illustrates in block form an apparatus that perform the permutation operation by the scheme of Embodiment 4-1 or 4-2. The pieces of input data $u_1, u_2, \ldots, u_8$ to be permuted are held in an input data memory 221. In a program memory 227 there is stored a program for executing the permutation operation of Eq. (48) or (49). A control device 220 follows the program to control an address generator 226 which generates addresses of pieces of data to be read out of the memory 221 one after another and addresses of an output data memory 222 into which pieces of data obtained by the calculation are written. At the same time, the control device 220 iteratively controls additions/subtractions (or XORing) using an accumulator 224 and registers 225. Each calculated value $u_i'$ is held in a temporary data memory 223 or accumulator 224 until it is used to calculate the next $u_j'$.

While Embodiments 4-1 and 4-2 have been described in connection with the permutation operation using a 8 by 8 matrix as the matrix P, it is apparent that they are equally applicable to a permutation operation in which n and m are set at integers equal to or greater than 2, m by n matrix is generally used as the matrix P and permuted data ($u_1'$, $u_2'$, . . . , $u_m'$) is calculated by the following equation.

$$\begin{bmatrix} u_1' \\ u_2' \\ \vdots \\ u_m' \end{bmatrix} = P \begin{bmatrix} u_1 \\ u_2 \\ \vdots \\ u_n \end{bmatrix}$$

As described above, it is considered that this embodiment is the smallest in the total number of memory reads; in general, the memory read/write is slower than the addition/subtraction, and this embodiment is faster than any conventional schemes by the amount of address calculation included.

Effect of the Invention

As described above, the byte permutation according to the present invention permits reduction of the number of processing steps by simultaneously performing masking operations of 2 bytes. Alternatively, the processing steps can be decreased by the combined use of rotation and shifts.

In the inverse calculation in $\text{mod} 2^m$, the workload can be reduced by performing additive padding instead of using the bit padding in the Zassenhaus scheme.

In the substitution and permutation according to the present invention, the required memory capacity and the computational complexity can be reduced by rearranging rows of the matrix P based on the same components of the permutation matrix P or the same substituted components $s_j(x)$.

According to the permutation method of the present invention, the computational complexity can be reduced by expressing the current permuted data using the preceding permuted data and the difference between the current and the previous permuted data.

Appendix

Proof of Inverse Algorithm

1. Preparation

Letting C be a natural number and n be a natural number equal to or greater than 1, $$C = c_0 + \sum_{i=1}^{n} c_i 2^{2^{i-1}}$$

In the following each variable has a bit size of $2^n$; therefore, $\mathrm{mod}2^n$ will be omitted unless any particular problems arise. In principle, numbers themselves will be written in uppercase alphabetic characters and individual digits in the development will be in lower-case alphabetic characters (with some exceptions).

Algorithm 1 is shown below:

```
modinv1(X)
{
    a_0 = x_0^{-1} mod 2;
    B_0 = [Xa_0 mod 2^{2^n} /2];
    Y_0 = a_0;
    for(i = 0; i ≤ n - 1; i ++){
        β_i = B_i mod 2^{2^i};
        a_{i+1} = -β_i Y_i mod 2^{2^i};
        Y_{i+1} = Y_i + a_{i+1} × 2^{2^i};
        B_{i+1} = [(Xa_{i+1} + B_i) mod 2^{2^{n-2^i}} /2^{2^i}];
    }
    return(Y_n);
}
```

Proposition 1.1([1]): If input X of Algorithm 1 meets the conditions $0 < X < 2^{2^n}$ and $(X, 2^{2^n}) = 1$, then return value $Y_2$ will satisfy $$XY_n \equiv 1 (\mathrm{mod}\, 2^{2^n})$$

To prove this proposition, the following lemmas will be discussed first.

Lemma 1.1: For $i \geq 0$, $B_i = [XY_i \mathrm{mod}\, 2^{2^n} / 2^{2^i}]$.

Proof. For i=0, the statement is clear. For each $k \geq 0$ assume that the following equation holds:

$$XY_k = B_k 2^{2^k} + R \quad (0 < R < 2^{2^k}) \quad (1)$$

For i=k, $$z = [x/y] \Leftrightarrow x = yz + x\, \mathrm{mod}\, y \quad (2)$$

is used to obtain $$(Xa_{k+1} + B_k) \mathrm{mod}\, 2^{2^n - 2^k} = B_{k+1} 2^{2^k} + (Xa_{k+1} + B_k) \mathrm{mod}\, 2^{2^k}$$

Multiplying the both sides by $2^{2^k}$, we have $$2^{2^k}(Xa_{k+1} + B_k) \mathrm{mod}\, 2^{2^n} = B_{k+1} 2^{2^{k+1}} + 2^{2^k}(Xa_{k+1} + B_k) \mathrm{mod}\, 2^{2^{k+1}} \quad (3)$$

It follows from Eq. (1) that $$XY_{k+1} = X(a_{k+1} 2^{2^k} + Y_k) = 2^{2^k}(Xa_{k+1} + B_k) + R$$

Substitution of this into Eq.(3) gives $$(XY_{k+1} - R) \mathrm{mod}\, 2^{2^n} = B_{k+1} 2^{2^{k+1}} + (XY_{k+1} - R) \mathrm{mod}\, 2^{2^{k+1}} \quad (4)$$

Since $0 < R < 2^{2^k}$, we have $$XY_{k+1} \mathrm{mod}\, 2^{2^n} - R = B_{k+1} 2^{2^{k+1}} + XY_{k+1} \mathrm{mod}\, 2^{2^{k+1}} - R$$

and eliminate R from either side. Noting that $$(XY_{k+1} \mathrm{mod}\, 2^{2^n}) \mathrm{mod}\, 2^{2^{k+1}} = XY_{k+1} \mathrm{mod}\, 2^{2^{k+1}}$$

the use of Eq. (2) gives $$B_{k+1} = \left[ \frac{XY_{k+1} \mathrm{mod}\, 2^{2^n}}{2^{2^{k+1}}} \right]$$

(Q.E.D.)

Next, the proposition will be proved.

Proof. It is sufficient to prove that $XY_i = 1 \mathrm{mod}\, 2^{2^i}$ for each i. For i=0, the answer is evident from the algorithm. For each $k \geq 0$ assume that the statement is true for i=k. For i=k+1, we have $$XY_{k+1} \mathrm{mod}\, 2^{2^{k+1}} = X(a_{k+1} 2^{2^k} + Y_k) \mathrm{mod}\, 2^{2^{k+1}}$$
$$= (X(-\beta_k Y_k \mathrm{mod}\, 2^{2^k}) 2^{2^k} + Y_k) \mathrm{mod}\, 2^{2^{k+1}}$$
$$= (-X\beta_k Y_k \mathrm{mod}\, 2^{2^k}) 2^{2^k} + XY_k \mathrm{mod}\, 2^{2^{k+1}}$$

We have $XY_k = 1 \mathrm{mod}\, 2^{2^k}$ using the induction hypothesis, and $(B_k \mathrm{mod}\, 2^{2^k}) 2^{2^k} = \beta_k 2^{2^k}$ using $B_k [XY_k \mathrm{mod}\, 2^{2^n} / 2^{2^k}]$ from the lemma. Therefore, $XY_k \mathrm{mod}\, 2^{2^{k+1}} = \beta_k 2^{2^k} + 1$ holds. Finally we obtain $$XY_{k+1} \mathrm{mod}\, 2^{2^{k+1}} = (-X\beta_k Y_k \mathrm{mod}\, 2^{2^k}) 2^{2^k} + \beta_k 2^{2^k} + 1$$
$$= ((\beta_k(1 - XY_k)) \mathrm{mod}\, 2^{2^k}) 2^{2^k} + 1$$
$$= ((\beta_k(1 - 1)) \mathrm{mod}\, 2^{2^k}) 2^{2^k} + 1$$
$$= 1$$

2. Algorithm 2

Algorithm 2 is shown below:

```
modinv2(X)
{
    B_0 = [X/2];
    A_1 = B_0 & 1;
    B_1 = [(XA_1 + B_0)/2];
    Y_1 = B_1 & 3;
    for(i = 1; i ≤ n - 1; i ++){
        A_{i+1} = -B_i Y_i;
        B_{i+1} = [(XA_{i+1} + B_i)/2^{2^i}];
        Y_{i+1} = Y_i + A_{i+1} × 2^{2^i};
    }
    return(Y_n);
}
```

Theorem 2.1: If the input X of algorithm 2 meets the condition $0 < X < 2^{2^n}$ and $(X, 2^{2^n}) = 1$, return value $Y_n$ will satisfy:

$$XY_n \equiv 1 (\mathrm{mod}\, 2^{2^n})$$

Proof. Algorithm 2 is a modified version of Algorithm 1, and several modular arithmetics are omitted. Accordingly, the value of each variable of the algorithm is free from modular arithmetic, and hence it has some value (garbage) added to the value in Algorithm 1. The value in Algorithm 1, for example, the variable X will hereinafter be described as $X^{(0)}$. For instance, $Y_2$ in Algorithm 1 is denoted by $Y_2^{(0)}$, and the garbage is denoted by C and expressed by $Y_2 = Y_2^{(0)} + C$. Note that the discussion on Algorithm 1 holds if every variable is described as $X^{(0)}$.

For $i \geq 1$, it will be proved by induction that the following mathematical expressions hold in Algorithm 2:

$$C_i = 0 \bmod 2^{2^{i-1}} \quad (5)$$

$$B_i = B_i^{(0)} + X \times \frac{C_i}{2^{2^{i-1}}} \quad (6)$$

$$Y_i = Y_i^{(0)} + C_i \times 2^{2^{i-1}} \quad (7)$$

Each $C_i$ is the afore-mentioned "garbage," which is at least a multiple of $2^{2^{i-1}}$. $B_i$ and $Y_i$ have added thereto $C_i$ in the above form.

When i=1, each of $A_1$, $B_1$, $Y_1$ is a processing equivalent to Algorithm 1, and hence no "garbage" exists. Accordingly, $C_1=0$, and Eqs. (5), (6) and (7) hold.

For each $k \geq 1$ assume that Eqs. (5), (6) and (7) hold for i=k. For i=k+1, we will show that $Y_{k+1}$ satisfies Eq. (7). To begin with, $$A_{k+1} = -B_k Y_k$$

is calculated. As the calculation continues, we have $$A_{k+1} = -\left(B_k^{(0)} + \frac{XC_k}{2^{2^{k-1}}}\right)\left(Y_k^{(0)} + C_k \times 2^{2^{k-1}}\right)$$

$$= -B_k^{(0)} Y_k^{(0)} - \frac{Y_k^{(0)} XC_k}{2^{2^{k-1}}} - B_k^{(0)} C_k \times 2^{2^{k-1}} - XC_k C_k$$

$$= a_{k+1}^{(0)} + D_{k+1} - \frac{Y_k^{(0)} XC_k}{2^{2^{k-1}}} - B_k^{(0)} C_k \times 2^{2^{k-1}} - XC_k C_k$$

From Algorithm 1, $$a_{k+1}^{(0)} = -\beta_k Y_k \bmod 2^{2^k} = -B_k Y_k \bmod 2^{2^k} \text{ and}$$

$$D_{k+1} = [B_k Y_k / 2^{2^k}] \times 2^{2^k}$$

That is, low-order $2^k$ bit portion of $-B_k Y_k$ is expressed by $a_{k+1}^{(0)}$, and the high order is expressed by $D_{k+1}$. Note that $D_{k+1}$ is $D_{k+1}=0 \bmod 2^{2^k}$ like $C_k$. From the above, we have $$Y_{k+1} = Y_k + A_{k+1} \times 2^{2^k}$$

$$= Y_k^{(0)} + C_k \times 2^{2^{k-1}} +$$

$$\left(a_{k+1}^{(0)} + D_{k+1} - \frac{Y_k^{(0)} XC_k}{2^{2^{k-1}}} - B_k^{(0)} C_k \times 2^{2^{k-1}} - XC_k C_k\right) \times 2^{2^k}$$

$$= Y_k^{(0)} + a_{k+1}^{(0)} \times 2^{2^k} +$$

$$\left(\frac{C_k}{2^{2^{k-1}}} + D_{k+1} - \frac{Y_k^{(0)} XC_k}{2^{2^{k-1}}} - B_k^{(0)} C_k \times 2^{2^{k-1}} - XC_k C_k\right) \times 2^{2^k}$$

$$= Y_{k+1}^{(0)} +$$

$$\left(\frac{C_k}{2^{2^{k-1}}} + D_{k+1} - \frac{Y_k^{(0)} XC_k}{2^{2^{k-1}}} - B_k^{(0)} C_k \times 2^{2^{k-1}} - XC_k C_k\right) \times 2^{2^k}$$

Now, set $$C_{k+1} = \left(\frac{C_k}{2^{2^{k-1}}} + D_{k+1} - \frac{Y_k^{(0)} XC_k}{2^{2^{k-1}}} - B_k^{(0)} C_k \times 2^{2^{k-1}} - XC_k C_k\right) \bmod 2^{2^n - 2^k}$$

Since each of individual variables has a bit size of $2^n$ and since the second term on the right-hand side of the above has been multiplied by $2^{2^k}$, we see that even if $C_{k+1}$ is calculated under modulo $2^{2^n - 2^k}$, the following equation holds:

$$Y_{k+1} = Y_{k+1}^{(0)} + C_{k+1} \times 2^{2^k} \quad (8)$$

Next we will show that $C_{k+1}$ satisfies Eq. (5), that $C_{k+1}$ satisfied Eq. (5), that is, $C_{k+1}$ is a multiple of $2^{2^k}$. Since $C_k = 0$ mod $2^{2^{k-1}}$, it is clear that $XC_k C_k = 0 \bmod 2^{2^k}$ and that $B_k^{(0)} C_k \times 2^{2^{k-i}} = 0 \bmod 2^{2^k}$. And, as mentioned previously, $D_{k+1} = 0 \bmod 2^{2^k}$. Now, $$\frac{C_k}{2^{2^{k-1}}} - \frac{Y_k^{(0)} XC_k}{2^{2^{k-1}}} = \frac{C_k}{2^{2^{k-1}}}(1 - Y_k^{(0)} X)$$

but since $XY_k^{(0)} = 1 \bmod 2^{2^k}$ from the lemma, we have $$(1 - Y_k^{(0)} X) = 0 \bmod 2^{2^k}$$

Using $C_k = 0 \bmod 2^{2^{k-1}}$, we have $$\frac{C_k}{2^{2^{k-1}}}(1 - Y_k^{(0)} X) = 0 \bmod 2^{2^k}.$$

Thus it is proved that $$C_{k+1} = 0 \bmod 2^{2^k} \quad (9)$$

From the above we find that Eqs. (5) and (7) hold also when i=k+1. If it is shown using this $C_{k+1}$ that when i=k+1, $B_{k+1}$ satisfies Eq. (6), then the theorem will be proved. Now, from Algorithm 2, $B_{k+1}$ becomes as follows:

$$B_{k+1} = [(XA_{k+1} + B_k)/2^{2^k}]$$

Using Eq. (2) the above equation can be modified as follows:

$$XA_{k+1} B_k = B_{k+1} \times 2^{2^k} + (XA_{k+1} + B_k) \bmod 2^{2^k}$$

Since the bit size of each variable is $2^n$, and since $B_{k+1}$ is multiplied by $2^{2^k}$, there exist no problem even if the both sides are calculated under modulo $2^{2^n - 2^k}$. Accordingly, we have $$(XA_{k+1} B_k) \bmod 2^{2^n - 2^k} B_{k+1} \times 2^{2^k} + (XA_{k+1} + B_k) \bmod 2^{2^k} \quad (10)$$

Then we have $$XA_{k+1} + B_k = X\left(a_{k+1}^{(0)} + D_{k+1} - \frac{Y_k^{(0)} XC_k}{2^{2^{k-1}}} - B_k^{(0)} C_k \times 2^{2^{k-1}} - XC_k C_k\right) +$$

$$B_k^{(0)} + X \times \frac{C_k}{2^{2^{k-1}}}$$

$$= Xa_{k+1}^{(0)} + B_k^{(0)} +$$

$$X\left(\frac{C_k}{2^{2^{k-1}}} + D_{k+1} - \frac{Y_k^{(0)} XC_k}{2^{2^{k-1}}} - B_k^{(0)} C_k \times 2^{2^{k-1}} - XC_k C_k\right)$$

Hence the left-hand side of Eq. (10) becomes as follows:

$$(XA_{k+1} + B_k) \bmod 2^{2^n - 2^k} = (Xa_{k+1}^{(0)} + B_k^{(0)}) \bmod 2^{2^n - 2^k} + XC_{k+1}$$

Furthermore, using Eq. (9), the second term on the right-hand side of Eq. (10) becomes as follows:

$$(XA_{k+1} + B_k) \bmod 2^{2^k} = (Xa_{k+1}^{(0)} + B_k^{(0)} + C_{k+1}) \bmod 2^{2^k}$$

$$= (Xa_{k+1}^{(0)} + B_k^{(0)}) \bmod 2^{2^k}$$

Therefore, we have $$Xa_{k+1}^{(0)} + B_k^{(0)}) \bmod 2^{2^n - 2^k} + XC_{k+1} = B_{k+1} \times 2^{2^k} + (Xa_{k+1}^{(0)} + B_k^{(0)}) \bmod 2^{2^k}$$

and $$(Xa_{k+1}^{(0)} + B_k^{(0)}) \bmod 2^{2^n - 2^k} = \left(B_{k+1} - X \frac{C_{k+1}}{2^{2^k}}\right) \times 2^{2^k} + (Xa_{k+1}^{(0)} + B_k^{(0)}) \bmod 2^{2^k}$$

And the following equation holds:

$$B_{k+1} - X \frac{C_{k+1}}{2^{2^k}} = \left[(Xa_{k+1}^{(0)} + B_k^{(0)}) \bmod 2^{2^n - 2^k} / 2^{2^k}\right] = B_{k+1}^{(0)}$$

Thus the following is proved:

$$B_{k+1} = B_{k+1}^{(0)} + X \frac{C_{k+1}}{2^{2^k}} \tag{11}$$

From the above, Eqs. (5), (6) and (7) hold also when i=k+1. For i=n, since the "garbage" $C_n \times 2^{2^n}$ becomes a multiple of $2^{2^k}$, and each variables has a bit size of $2^{2n}$, we obtain $Y_n = Y_n^{(0)}$; from the proposition $$XY_n = 1 \bmod 2^{2^n}$$

holds. Thus the proposition is proved. (Q.E.D.)

Reference

[1] Kawamura, "New algorithms for inverse module a prime power," SCIS'97-14C.

What is claimed is:

1. A substitution-permutation apparatus which, by the following substitution-permutation over a ring R $$\begin{bmatrix} y_1 \\ y_2 \\ \vdots \\ y_m \end{bmatrix} = P \begin{bmatrix} s_1(x_1) \\ s_2(x_2) \\ \vdots \\ s_n(x_n) \end{bmatrix}$$

where $$P = \begin{bmatrix} p_{11} & p_{12} & \cdots & p_{1n} \\ p_{21} & p_{22} & & p_{2n} \\ \vdots & & & \vdots \\ p_{m1} & p_{m2} & \cdots & p_{mn} \end{bmatrix}$$

$p_{ij} \in R$, $s_j: R \to R$ $i=1, 2, \ldots, m$ $j=1, 2, \ldots, n$ performs a substitution-permutation operation of an input data sequence $(x_j)$ to calculate a data sequence $(y_i)$, said apparatus comprising:

storage means for storing: precalculated values of $v_i$ (whose dimensions are up to m and may differ individually) over said ring R necessary for said substitution-permutation, obtained by swapping rows or columns of said matrix P for which some of $p_{ij}$ or $s_j$ are the same values; a precalculated value of a function $S_k: R \to R^m$; precalculated values of n vectors $w_k \in R^m$; and an integer k;

input means for storing said input data sequence $(x_j)$ in said storage means;

k-initialization means for setting said integer k to 0;

k-updating means for updating said k in said storage means to k+1;

$S_k$ calculating means for reading out each $S_k$ and input data $(x_k)$ from said storage means to obtain the result of calculation of a vector $S_k(x_k)$ and for storing said vector as a vector $w_k$ in said storage means;

means for reading out of said storage means a set of vectors $\{v_1\}$ necessary for forming a k-th column of said matrix P and for generating a vector $u_k$;

$u_k * S_k$ calculating means for reading out said $w_k$ from said storage means and calculating the product for each element and for updating said $w_k$ with the calculation result;

control means for reading out said k stored in said storage means and for actuating said $S_k$ calculating means, said $u_k * S_k$ calculating means and said k-updating means one after another until k=n; and output means for reading out each $w_k$ stored in said storage means and for calculating and outputting their sum.

2. A substitution-permutation apparatus which, by the following substitution-permutation over a ring R $$\begin{bmatrix} y_1 \\ y_2 \\ \vdots \\ y_m \end{bmatrix} = P \begin{bmatrix} s_1(x_1) \\ s_2(x_2) \\ \vdots \\ s_n(x_n) \end{bmatrix}$$

where $$P = \begin{bmatrix} p_{11} & p_{12} & \cdots & p_{1n} \\ p_{21} & p_{22} & & p_{2n} \\ \vdots & & & \vdots \\ p_{m1} & p_{m2} & \cdots & p_{mn} \end{bmatrix}$$

$p_{ij} \in R$, $s_j: R \to R$ $i=1, 2, \ldots, m$ $j=1, 2, \ldots, n$ performs a substitution-permutation operation of an input data sequence $(X_j)$ to calculate a data sequence $(y_i)$, said apparatus comprising:

storage means for storing: a precalculated value of the following equation with rows of a matrix P rearranged $$SP_{lj}(x_j) = \begin{bmatrix} p_{t(ql)j} s_j(x_j) \\ p_{t(ql+1)j} s_j(x_j) \\ \vdots \\ p_{t(rl)j} s_j(x_j) \end{bmatrix}$$

where b(j) is a natural number equal to or greater than 1 but equal to or smaller than n, l=1,2, . . . ,b(j), t:$\{1, 2, \ldots, m\} \to \{1, 2, \ldots, m\}$ is a permutation, and ql and rl are natural numbers greater than 1 but smaller than m+1, where ql≦rl; precalculated values of n vectors $w_k \in R^m$; and an integer k;

input means for storing said input data sequence $(x_j)$ in said storage means;

k-initialization means for setting said integer k to 0;

k-updating means for updating said k stored in said storage means to k+1;

$SP_k$ calculating means for reading out input data $x_k$ and $SP_{lj}(x_k)$ from said storage means, for calculating said $SP_{lj}(x_k)$ for each l and concatenating the calculated results in correspondence to a k-th column of said rearranged matrix P to obtain an m-dimensional vector, and for updating said $w_k$ stored in said storage means with said m-dimensional vector as $w_k$, where l=1, 2, . . . , b(j);

control means for reading out said k stored in said storage means and for actuating said $SP_k$ calculating means and said k-updating means one after the other until k=n; and output means for reading out each $w_k$ stored in said storage means and for calculating and outputting their sum.

3. The apparatus of claim 2, further including shift operation means for shifting a column vector of said read-out vectors $SP_k(x_i)$ in the column direction to update said $w_k$ stored in said storage means.

4. The apparatus of claim 2, further comprising:

means for obtaining a sum vector by calculating the sum of some of said read-out vectors $SP_{ij}(x_k)$;

means for obtaining a plurality of column vectors by shifting in different column directions a partial sum vector obtained in the course of calculating said sum vector;

means for obtaining an added vector by adding said plurality of column vectors and said sum vector; and means for concatenating said added vector and said sum vector into an m-dimensional vector.

5. The apparatus of claim 2, further comprising:

means for obtaining a sum vector by calculating the sum of some of said read-out vectors $SP_{ij}(x_k)$;

means for obtaining a column vector by rotating in the column direction a partial sum vector obtained in the course of calculating said sum vector;

means for obtaining an added vector by adding said column vector and said sum vector; and means for concatenating said added vector and said sum vector into an m-dimensional vector.

6. A recording medium having recorded thereon a program for the execution by a computer of a substitution-permutation apparatus which, by the following substitution-permutation over a ring R $$\begin{bmatrix} y_1 \\ y_2 \\ \vdots \\ y_m \end{bmatrix} = P \begin{bmatrix} s_1(x_1) \\ s_2(x_2) \\ \vdots \\ s_n(x_n) \end{bmatrix}$$

where $$P = \begin{bmatrix} p_{11} & p_{12} & \cdots & p_{1n} \\ p_{21} & p_{22} & & p_{2n} \\ \vdots & & & \vdots \\ p_{m1} & p_{m2} & \cdots & p_{mn} \end{bmatrix}$$

$p_{ij} \in R$, $s_j: R \to R$ $i=1, 2, \ldots, m$ $j=1, 2, \ldots, n$ performs a substitution-permutation operation of an input data sequence $(x_j)$ to calculate a data sequence $(y_i)$ and in which storage means has stored therein: precalculated values of $v_i$ (whose dimensions are up to m and may differ individually) over said ring R necessary for said substitution-permutation, obtained by swapping rows or columns of said matrix P for which some of $p_{ij}$ or $s_j$ are the same values; a precalculated value of a function $S_k: R \to R^m$; precalculated values of n vectors $w_k \in R^m$; and an integer k; said program comprising the steps of:

(a) storing said input data sequence $x_j$ in said storage means;

(b) initializing said integer k to 0;

(c) updating said k in said storage means to k+1;

(d) reading out each $S_k$ and input data $(x_k)$ from said storage means to obtain the result of calculation of a vector $S_k(x_k)$ and storing said vector as a vector $w_k$ in said storage means;

(e) reading out of said storage means a set of vectors $\{v_1\}$ necessary for forming a k-th column of said matrix P and generating a vector $u_k$;

(f) reading out said $w_k$ from said storage means and calculating the product for each element and updating said $w_k$ with the calculation result;

(g) reading out said k stored in said storage means and performing said $S_k$ calculating step, said $w_k$ updating steps and said k-updating step one after another until k=n; and (h) reading out each $w_k$ stored in said storage means and calculating; and outputting their sum.

7. A recording medium having recorded thereon a program for the execution by a computer of a substitution-permutation apparatus which, by the following substitution-permutation over a ring R $$\begin{bmatrix} y_1 \\ y_2 \\ \vdots \\ y_m \end{bmatrix} = P \begin{bmatrix} s_1(x_1) \\ s_2(x_2) \\ \vdots \\ s_n(x_n) \end{bmatrix}$$

where $$P = \begin{bmatrix} p_{11} & p_{12} & \cdots & p_{1n} \\ p_{21} & p_{22} & & p_{2n} \\ \vdots & & & \vdots \\ p_{m1} & p_{m2} & \cdots & p_{mn} \end{bmatrix}$$

$p_{ij} \in R$, $s_j: R \to R$ $i=1, 2, \ldots, m$ $j=1, 2, \ldots, n$ performs a substitution-permutation operation of an input data sequence $(x_j)$ to calculate a data sequence $(y_i)$ and in which storage means has recorded therein a precalculated value of the following equation with rows of a matrix P rearranged $$SP_{ij}(x_j) = \begin{bmatrix} p_{t(ql)j} s_j(x_j) \\ p_{t(ql+1)j} s_j(x_j) \\ \vdots \\ p_{t(rl)j} s_j(x_j) \end{bmatrix}$$

where b(j) is a natural number equal to or greater than 1 but equal to or smaller than n, l=1,2, . . . ,b(j), t: {1, 2, . . . , m}→{1, 2, ..., m} is a permutation, and ql and rl are natural numbers equal to or greater than 1 but equal to or smaller than m, where ql≦rl, together with; precalculated values of n vectors $w_k \in R^m$ and an integer k, said program comprising the steps of;

(a) storing said input data sequence $(x_j)$ in said storage means;

(b) initializating said integer k to 0;

(c) updating said k stored in said storage means to k+1;

(d) reading out input data $x_k$ from said storage means, calculating $SP_{lj}(x_k)$ for each l, concatenating the calculated results in correspondence to a k-th column of said rearranged matrix P to obtain an m-dimensional vector, and updating said $w_k$ stored in said storage means with said m-dimensional vector as $w_k$, where l=1, 2, . . . , b(j);

(e) reading out said k stored in said storage means and performing said $SP_k$ calculating step and said k-updating step one after the other until k=n; and (f) reading out each $w_k$ stored in said storage means and calculating and outputting their sum.

8. The recording medium of claim 7, wherein said program further comprises the step of shifting the column vector of said read-out vector $SP_k(x_j)$ in the column direction to update said $w_k$ stored in said storage means.

9. The recording medium of claim 7, wherein said program further comprises the steps of:

obtaining a sum vector by calculating the sum of some of said read-out vectors $SP_{lj}(x_k)$;

obtaining a plurality of column vectors by shifting in different column directions a partial sum vector obtained in the course of calculating said sum vector;

obtaining an added vector by adding said plurality of column vectors and said sum vector; and concatenating said added vector and said sum vector into an m-dimensional vector.

10. The recording medium of claim 7, wherein said program further comprises the steps of:

(g) obtaining a sum vector by calculating the sum of some of said read-out vectors $SP_{lj}(x_k)$;

(h) obtaining a column vector by rotating in the column direction a partial sum vector obtained in the course of calculating said sum vector;

(i) obtaining an added vector by adding said column vector and said sum vector; and (j) concatenating said added vector and said sum vector into an m-dimensional vector.

\* \* \* \* \*